(12) United States Patent
Bourlas et al.

(10) Patent No.: US 6,459,687 B1
(45) Date of Patent: Oct. 1, 2002

(54) METHOD AND APPARATUS FOR IMPLEMENTING A MAC COPROCESSOR IN A COMMUNICATION SYSTEM

(75) Inventors: Yair Bourlas, San Diego, CA (US); Lewis N. Cohen, San Diego, CA (US); Michael G. Reeves, San Diego, CA (US); Kenneth L. Stanwood, Cardiff by the Sea, CA (US)

(73) Assignee: Ensemble Communications, Inc., San Diego, CA (US)

( * ) Notice: Subject to any disclaimer, the term of this patent is extended or adjusted under 35 U.S.C. 154(b) by 51 days.

(21) Appl. No.: 09/800,267

(22) Filed: Mar. 5, 2001

(51) Int. Cl.[7] .................................................. H04Q 7/00
(52) U.S. Cl. ........................ 370/328; 370/235; 370/419; 712/34
(58) Field of Search .............................. 370/230–230.1, 370/235, 328, 338, 428, 463; 709/250

(56) References Cited

U.S. PATENT DOCUMENTS

| | | |
|---|---|---|
| 3,949,404 A | 4/1976 | Fletcher et al. |
| 4,495,619 A | 1/1985 | Acampora |
| 5,297,144 A | 3/1994 | Gilbert et al. |
| 5,420,851 A | 5/1995 | Seshadri et al. |
| 5,444,698 A | 8/1995 | Kito |
| 5,511,082 A | 4/1996 | How et al. |
| 5,615,212 A | 3/1997 | Ruszczyk et al. |
| 5,638,371 A | 6/1997 | Raychaudhuri et al. |
| 5,638,374 A | 6/1997 | Heath |
| 5,644,576 A * | 7/1997 | Bauchot et al. ............. 370/437 |
| 5,675,573 A | 10/1997 | Karol et al. |
| 5,751,708 A | 5/1998 | Eng et al. |
| 5,768,254 A | 6/1998 | Papadopoulos et al. |
| 5,828,695 A | 10/1998 | Webb |
| 5,859,619 A | 1/1999 | Wu et al. |
| 5,890,055 A | 3/1999 | Chu et al. |
| 5,936,949 A * | 8/1999 | Pasternak et al. ........... 370/328 |
| 6,006,069 A | 12/1999 | Langston |
| 6,016,311 A | 1/2000 | Gilbert et al. |
| 6,016,313 A | 1/2000 | Foster, Jr. et al. |
| 6,038,455 A | 3/2000 | Gardner et al. |
| 6,094,421 A | 7/2000 | Scott |

(List continued on next page.)

OTHER PUBLICATIONS

M. Bhardwaj and B. Ljusanin, "The Renaissance–A Residue Number System Based Vector Co–Processor for DSP Dominated Embedded ASICs", IEEE Jul. 1998, pp. 202–207.*

J. H. Schiller, "A Flexible Co–Processor for High–Performance Communication Support", IEEE May 1995, pp. 1445–1449.*

Lin., et al., "*Error Control Coding, Fundamentals and Applications*", Prentice–Hall Computer Applications in Electrical Engineering Series., 1993, pp. 315–349.

(List continued on next page.)

*Primary Examiner*—Hassan Kizou
*Assistant Examiner*—Thai D Hoang
(74) *Attorney, Agent, or Firm*—Knobbe Martens Olson & Bear LLP

(57) ABSTRACT

Disclosed is a novel method and system for efficiently synchronizing, transmitting, and receiving data between a base station and a plurality of customer premises. A MAC coprocessor (MCP) is implemented, which works in conjunction with the MAC in order to produce a robust, high throughput communication system. The MAC coprocessor performs many of the tasks typically performed by prior art MAC's, including: during a downlink, storing a data frame, sorting the data frame according to modulation type or other criteria, determining when the data frame is full, and appending a set of CPE settings to the data frame. During an uplink, the MAC coprocessor receives all data and routes the data either to the MAC or a network backhaul. A MAC coprocessor may be used in both the base station and Customer Premises. In both the downlink and uplink processes, having a MAC coprocessor working in conjunction with the MAC may significantly increase the communication system's throughput.

71 Claims, 13 Drawing Sheets

U.S. PATENT DOCUMENTS

| | | | |
|---|---|---|---|
| 6,112,080 A | | 8/2000 | Anderson et al. |
| 6,167,029 A | * | 12/2000 | Ramakrishnan ............. 370/235 |
| 6,167,032 A | * | 12/2000 | Allison et al. .............. 370/252 |
| 6,212,195 B1 | * | 4/2001 | McCormack et al. ....... 370/419 |
| 6,223,196 B1 | * | 4/2001 | Hattori et al. .............. 708/523 |
| 6,229,817 B1 | * | 5/2001 | Fischer et al. .............. 370/445 |
| 6,345,310 B1 | * | 2/2002 | Allison et al. .............. 709/250 |
| 2002/0015401 A1 | | 2/2002 | Subramanian |

OTHER PUBLICATIONS

L.H. Charles Lee, "Convolutional Coding, Fundamentals and Applications", Artech House, Inc., 1997, pp. 11–51.

Redl, et al., "An Introduction to GSM", Artech House, Inc., 1995; pp. 84, 85 and 95.

C.E. Shannon, "A Mathematical Theory of Communication", Bell System Technical Journal, pp. 379–423 (Part 1), 623–656 (Part II), Jul. 1948.

Ulm., et al., "Data–Over–Cable Interface Specifications, Radio Frequency Interface Specification", Hewlett Packard Interim Specification, Doc. Control No.: SP–RF1101–970321, published Mar. 21, 1997 by MCNS Holdings, L.P., Section 6, pp. 43–85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice Hall, Oct. 1995, Chapter 3, pp. 21–25.

* cited by examiner

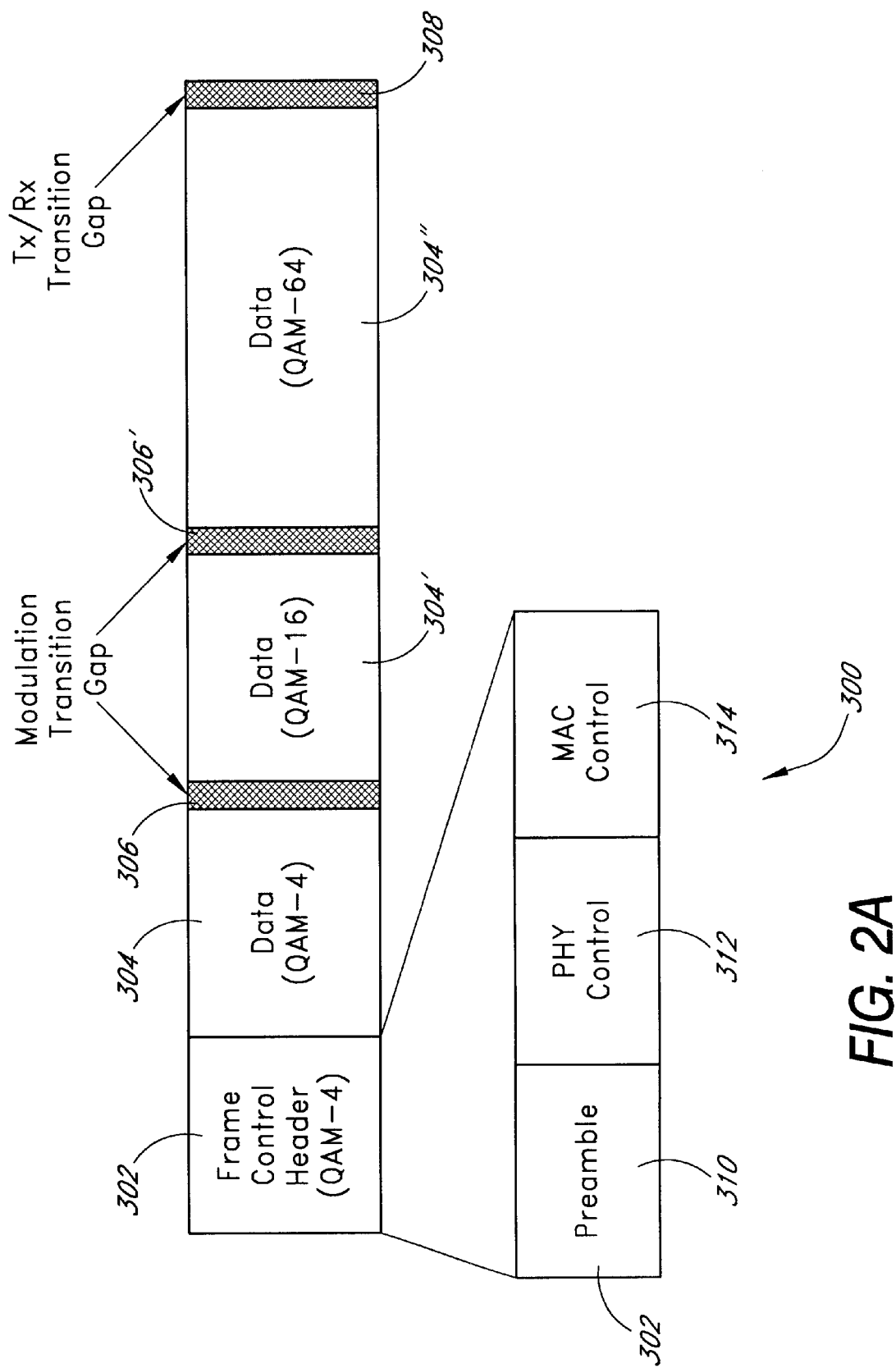

METHOD AND APPARATUS FOR IMPLEMENTING A MAC COPROCESSOR IN A COMMUNICATION SYSTEM

BACKGROUND

1. Field of the Invention

This invention relates to wireless communication systems, and more particularly to a method and apparatus for efficiently transmitting and receiving data with a communications system including a Media Access Control coprocessor.

2. Description of the Related Art

As described in the commonly assigned related U.S. Pat. No.: 6,016,311, a wireless communication system facilitates two-way communication between a plurality of subscriber radio stations or subscriber units (fixed and portable) and a fixed network infrastructure. Exemplary communication systems include mobile cellular telephone systems, personal communication systems ("PCS"), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes a time "frame" is used as the basic information transmission unit. Each frame is sub-divided into a plurality of time slots. Some time slots are used for control purposes and some for information transfer. Subscriber units typically communicate with a selected base station using a "duplexing" scheme thus allowing for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing ("TDD") or frequency division duplexing ("FDD") methods to facilitate the exchange of information between the base station and the subscriber units. In a TDD system, data is transmitted and received on a single channel. A typical TDD system will allocate a portion of each data frame to transmitting data and a remaining portion to receiving data. Alternatively, a FDD system transmits and receives data simultaneously. More specifically, a typical FDD system may transmit an entire data frame on a first channel, while simultaneously receiving an entire data frame on a second channel. Both TDD and FDD systems of duplexing are well known in the art.

Recently, wideband or "broadband" wireless communications networks have been proposed for delivery of enhanced broadband services such as voice, data and video. The broadband wireless communication system facilitates two-way communication between a plurality of base stations and a plurality of fixed subscriber stations or Customer Premises Equipment ("CPE"). One exemplary broadband wireless communication system is described in the incorporated U.S. Pat. No.: 6,016,311, and is shown in the block diagram of FIG. 1. As shown in FIG. 1, the exemplary broadband wireless communication system 100 includes a plurality of cells 102. Each cell 102 contains a base station 106 and an active antenna array 108. Each cell 102 provides wireless connectivity between the cell's base station 106 and a plurality of CPE's 110 positioned at fixed customer sites 112 throughout the coverage area of cell 102. In addition, each of the CPE's 110 is coupled to a plurality of end user connections, which may include both residential and business customers. Consequently, the end user connections of the system have different and varying usage and bandwidth requirement needs. Each cell may service several hundred or more residential and business CPE's 110, and each CPE 110 may service several hundred or more end user connections.

Broad-band wireless communication system 100 provides true "bandwidth-ondemand" to the plurality of CPE's 110. The CPE's 110 request bandwidth allocations from their respective base stations 104 based upon the type and quality of services requested by the end user connections served by the CPE's 110. Each CPE 110 may include a plurality of end user connections, each of the connections potentially using a different broadband service. Different broadband services have different bandwidth and latency requirements. The type and quality of services available to the end user connections are variable and selectable. The amount of bandwidth dedicated to a given service is determined by the information rate and the quality of service ("QoS") required by that service (and also taking into account bandwidth availability and other system parameters). For example, T1-type continuous data services typically require a great deal of bandwidth having well controlled delivery latency. Until terminated, these services require constant bandwidth allocation for each frame. In contrast, certain types of data services such as Internet protocol data services ("TCP/IP") are bursty, often idle (which at any one instant may require zero bandwidth), and are relatively insensitive to delay variations when active.

Prior art communication systems typically include a media access control ("MAC") which allocates available bandwidth on one or more physical channels on the uplink and the downlink. Within the uplink and downlink subframes, the base station MAC allocates the available bandwidth between the various services depending upon the priorities and rules imposed by their quality of service ("QoS"). The MAC transports data between higher layers, such as TCP/IP, and a physical layer, such as a physical channel. According to the prior art, the MAC is software that executes on a processor in the base station. When requests for bandwidth arrive from CPE's 110, the MAC software must allocate the frame bandwidth among all received requests. If an unexpected high volume of data (bandwidth requests, for example) is received by the MAC, there is a possibility that the software may not be able to respond in real time. If the MAC software cannot respond in real time, data will be lost. For example, MAC software may not be able to process all the incoming data in time to transmit it in the current time frame. This may result in data transfer being delayed, and possibly missed by the receiving CPE 110. Alternatively, the data may be discarded by the MAC, possibly corrupting large quantities of data. A MAC that can respond in real-time to a high data volume is therefore desirable. In addition, a system that allows a higher data throughput than MAC software is desired.

SUMMARY OF THE INVENTION

The present invention is a novel method and apparatus for efficiently synchronizing, transmitting, and receiving data between a base station and a plurality of CPE's 110. The method and apparatus achieve these objectives by implementing a MAC coprocessor, which works in conjunction with the MAC, in order to produce a robust, high throughput communication system.

In one embodiment of the present invention, a MAC coprocessor is coupled to the base station MAC. The MAC coprocessor may take a portion of the work load from the MAC, which is software implemented, by performing many of the tasks typically performed by prior art MAC's. These tasks may include, during a downlink, sorting data according to priority, storing a data frame of highest priority data, sorting the data frame according to modulation type, forward error correction ("FEC") type, end user connection ID, or other criteria, appending a set of CPE settings to the data frame, and appending physical layer information (used by the modem) to the data frame. During an uplink, according to the present invention, the MAC coprocessor receives all data and routes the data either to the MAC or a network backhaul. In both the downlink and uplink processes, having a MAC coprocessor working in conjunction with the MAC may significantly increase the communication system's throughput.

In accordance with the present invention, the present inventive method transmits downlink data directly from a QoS module to the MAC coprocessor ("MCP") for storage, sorting, and updating. In other words, the MAC software has a much lighter load because it never sees the actual data. Once the data is received by the MCP, the MCP reads a series of CPE settings from a look-up table. CPE settings may include, among others, modulation type, FEC type, encryption ON/OFF, encryption key, and key number for the particular CPE intended to receive the current downlink data. The data is then stored in a buffer, sorted according to the modulation type, FEC type, or connection ID of the current connection (the term "connection" as used herein refers to an end user data flow coupled to a CPE). In one embodiment, the MCP implements a connection oriented MAC which transports data from an end user data flow that is connectionless, for example, IP. The MCP adds certain CPE settings to the data packet in the buffer that are necessary for the intended CPE to recognize and receive the data. In addition, the MCP adds physical layer setting that are necessary for the modem to transmit the data in the appropriate format. The MCP continues to receive data packets from the QoS module until a predetermined period has passed, and then sends the data frame to the modem. If the data frame is full before the predetermined period has passed, the MCP may not receive any more data packets from the QoS module until the predetermined period has passed and the current data frame has been sent to the modem. As such, the MCP must determine how many physical slots are required for each data packet received from the QoS, at the respective CPE modulation and FEC settings. If the data frame is not full when the predetermined period timeout has occurred, the modem may fill the open spaces in the data frame with specified fill cells or bytes. In the present disclosure, a predetermined period of one millisecond will be used in many examples. Those skilled in the art will recognize that a two millisecond and one-half millisecond (500 microseconds) time frame are also very common for TDD systems. In addition, it is contemplated that any other time period, smaller or greater, than one millisecond may be substituted for the predetermined period. In another embodiment, each CPE 110 has a MAC Coprocessor ("CMCP") for building an uplink data burst (a data burst is any combination of user data and control information). The CMCP 450 may sort the data received by a plurality of end user connections, prioritize the data according to the respective priorities of each end user connection, build the data burst, and send the data burst at the time indicated by the uplink subframe. In addition, a system that includes CMCP's may perform, in cooperation with the BS MCP 402, any combination of packing/ unpacking, payload header compression/decompression, and fragmentation/defragmentation. However, these operations may be implemented using other hardware configurations.

In accordance with the present invention, for TDD systems the MAC determines an uplink/downlink split ("up/down split") to be used by the MAC coprocessor. More specifically, the MAC uses information such as, among others, pending bandwidth requests from CPE's 110, up/down split settings of other MAC's in the same BS, and a downlink utilization message from the MAC coprocessor in order to determine the probable amount of uplink/downlink data for the subsequent time frame. Thus, in determining the up/down split, the MAC splits the predetermined period in to a downlink and uplink portion. Because the MAC does not know exactly how much downlink data will be available to transmit, the MAC coprocessor may dynamically update the up/down split, allowing all receiving CPE's 110 to know when the end of the downlink process will actually occur.

BRIEF DESCRIPTION OF THE DRAWINGS

FIG. 2A shows one example of a downlink sub-frame that is adapted for use with the present communication system.

DETAILED DESCRIPTION OF THE PREFERRED EMBODIMENT

Throughout this description, the preferred embodiment and examples shown should be considered as examples, rather than as limitations on the present invention. The term data packet, as used herein, may refer to either user data or protocol and control messages.

Figure 1:
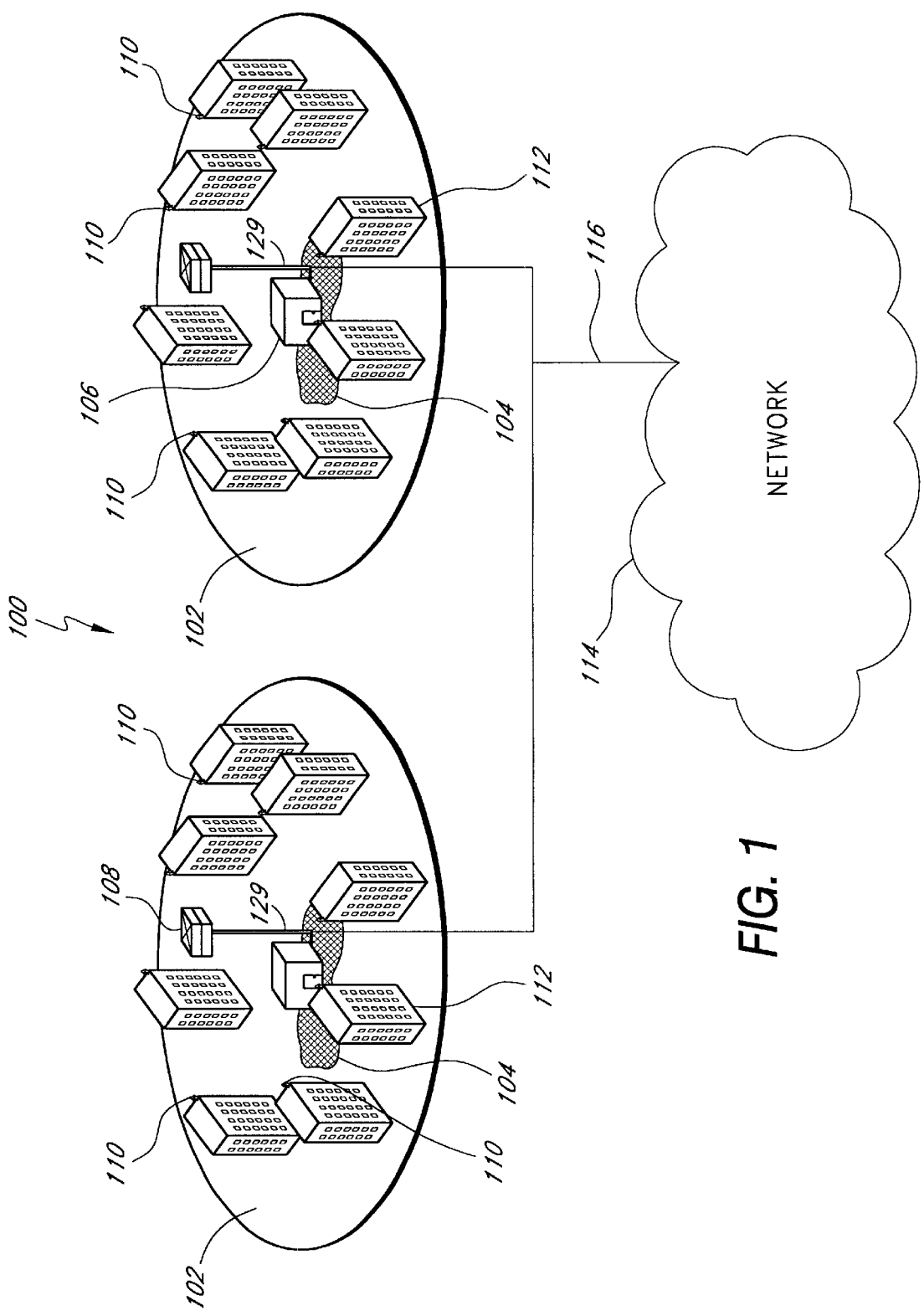
FIG. 1 is a simplified block diagram of a broadband wireless communication system.

FIG. 1 is a high level block diagram illustrating a wireless communication system 100. The wireless communication system 100 provides a wireless link with customers and businesses to share data or access a network 114, for example, the Internet. The wireless communication system 100 comprises a plurality of cells 102. Each cell 102 contains a base station ("BS") 104 and a plurality of customer premises equipment ("CPE's") 110 located at fixed customer sites 112 throughout the coverage area of the cell 102. Each CPE 110 communicates with the BS 104 over a wireless link. The BS 104, in turn, communicates with the network 114 using a communication link or "backhaul" 116. The backhaul 116 may comprise, for example, coaxial cable, fiberoptic cable, microwave links, or other high throughput connections.

The downlink (i.e., from the BS 104 to the plurality of CPE's 110) of the communication system shown in FIG. 1 operates on a point-to-multi-point basis. As described in the related U.S. Pat. No. 6,016,311, which is hereby incorporated by reference herein, the central BS 104 includes a sectored active antenna array 108 which is capable of simultaneously transmitting to several sectors. In one embodiment of the system 100, the active antenna array 108 transmits to four independent sectors simultaneously. Within a given frequency channel and antenna sector, all stations receive the same transmission. The BS 104 is the only transmitter operating in the downlink direction, hence it transmits without having to coordinate with other BS 104's. The CPE's 110 monitor the addresses in the received messages and retain only the data addressed to them.

The CPE's 110 share the uplink on a demand basis that can be controlled by the BS. Depending upon the class of services utilized by a particular CPE 110, the BS 104 may issue a selected CPE 110 continuing rights to transmit on the uplink, or the right to transmit may be granted after receipt of a request from a CPE 110. In addition to individually addressed messages, the BS 104 may also send messages to multicast groups, as well as broadcast messages to all CPE's 110.

In one embodiment, the BS 104 maintains sub-frame maps of the bandwidth allocated to the uplink and the downlink. As described in more detail in U.S. Pat. No. 6,016,311, the uplink and downlink are preferably multiplexed in a time-division duplex (or "'DD") manner. Although the present invention is described with reference to its application in a TDD system, the invention is not so limited. Those skilled in the communications art shall recognize that the present inventive method and apparatus can readily be adapted for use in a FDD system.

In one embodiment adapted for use in a TDD system, a frame is defined as comprising N consecutive time periods or time slots (where N remains constant). In accordance with this "frame-based" approach, the first $N_1$ time slots are dynamically configured (where N is greater than or equal to $N_1$) for downlink transmissions only. The remaining $N_2$ time slots are dynamically configured for uplink transmissions only (where $N_2$ equals $N-N_1$). Under this TDD frame-based scheme, the downlink subframe is preferably transmitted first and is prefixed with information that is necessary for frame synchronization.

As described in more detail in related U.S. Pat. No. 6,016,311, in another embodiment, an Adaptive Time Division Duplex ("ATDD") system may be implemented. In ATDD mode, the percentage of the TDD frame allocated to downlink versus uplink is a system parameter which may change with time. In other words, an ATDD system may vary the ratio of downlink data to uplink data in sequential time frames. In terms of the example above, in an ATDD system, $N_1$ and $N_2$ (where $N_1$ is the downlink sub-frame and $N_2$ is the uplink subframe) may be different for each data frame, while maintaining the relationship $N=N_1+N_2$. A data frame that is split between uplink and downlink could be either a TDD frame, or an ATDD frame. It is therefore contemplated that all systems and methods described herein with relationship to a TDD frame could be adapted to an ATDD frame, and vice versa.

In yet another embodiment, a FDD system may be implemented by sending N time slots of data and receiving N time slots of data simultaneously on different channels. In yet another embodiment, a half-duplex FDD system may be implemented by sending N time slots of data on a first channel during a first time period and receiving N time slots of data on a second channel during a second time period, wherein the two time periods do not overlap.

Figure 2:
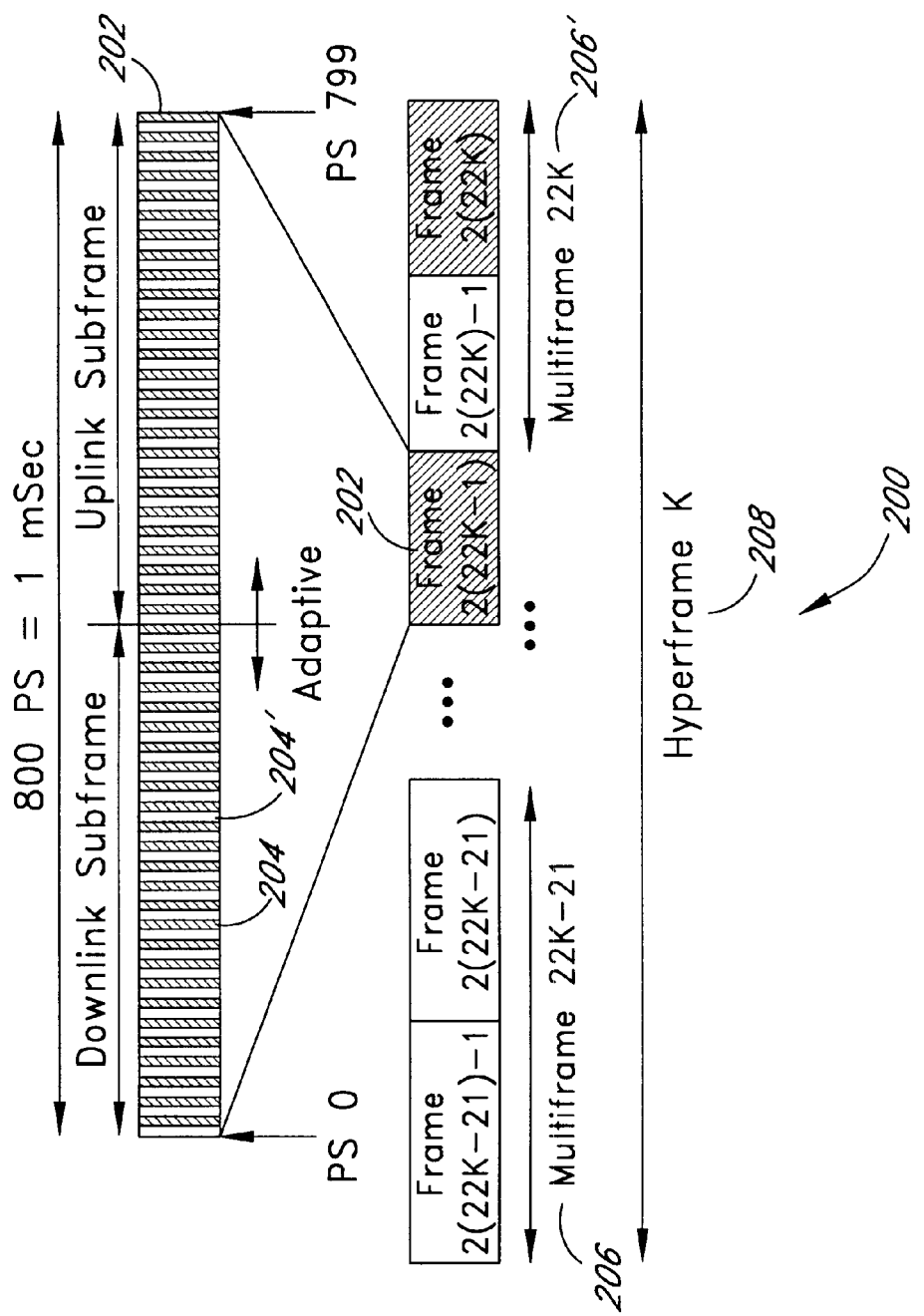
FIG. 2 represents a TDD frame and multi-frame structure.

FIG. 2 shows a TDD frame and multi-frame structure 200 that can be used by a communication system (such as that shown in FIG. 1). As shown in FIG. 2, the TDD frame 200 is subdivided into a plurality of physical slots ("PS") 204, 204'. In the embodiment of FIG. 2, the TDD frame 200 is one millisecond in duration and includes 800 physical slots. Alternatively, the present invention can be used with frames having longer or shorter duration and with more or less PS's. Some form of digital encoding, such as the well-known Reed-Solomon ("RS") encoding, convolutional encoding, or turbo code encoding, is performed on the digital information over a pre-defined number of bit units referred to as physical layer information elements ("PI"). The modulation or FEC type may vary within the frame and determines the number of PS's (and therefore the amount of time) required to transmit a selected PI. In the embodiment described hereafter, the detailed description refers to data being sent and received using three different modulation types, namely, QAM-4, QAM-16, and QAM 64. In alternative embodiments, any other modulation type, FEC type, or variation of a modulation or FEC type may be used. For example, a RS encoding system may use different variations of block sizes or code shortening, a convolutional encoding system may vary the code rate, and a turbo code system may use any block size, code rate, or code shortening.

To aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises 22 multi-frames 206. Other frame, multi-frame and hyper-frame structures can be used with the present invention. For example, in another embodiment of the present invention, each multi-frame 206 comprises 16 frames 202, and each hyper-frame comprises 32 multi-frames 206.

FIG. 2A shows one example of a downlink sub-frame 300 that can be used by the BS 104 to transmit information to the plurality of CPE's 110. FIG. 2A shows an exemplary TDD downlink subframe. In a TDD system, each time frame is divided into a downlink sub-frame and an uplink sub-frame. More specifically, during each one millisecond time frame (or other predetermined period), the downlink sub-frame is first transmitted from the BS 104 to all CPE's 110 in the sector, after which the uplink sub-frame is received by the BS 104 from particular CPE's 110. The downlink sub-frame 300 is dynamic, such that it may be different in sequential time frames depending on, among others, an uplink/downlink split determined by the MAC 420. In a FDD system, the time frame is not divided between uplink and downlink data. Instead, a FDD downlink subframe is an entire frame of downlink data (e.g. one millisecond) on a first channel, and an uplink subframe is an entire frame of uplink data on a second channel. In a typical FDD system the downlink subframe and uplink subframe may be transmitted simultaneously during the same predetermined period. Thus, in a FDD system both the BS 104 and the CPE's 110 may receive and transmit at the same time, using different channels. In another embodiment, the downlink subframe and uplink subframe may not be transmitted at the same time, but still use different channels.

The downlink sub-frame 300 preferably comprises a frame control header 302, a plurality of downlink data PS's 304 grouped by any combination of modulation type, FEC type, CPE index, and connection ID (e.g., PS 304 data modulated using a QAM-4 modulation scheme, PS 304' data modulated using QAM-16, etc.) and possibly separated by associated modulation transition gaps ("MTGs") 306 used to separate differently modulated data, and a transmit/receive transition gap 308. In any selected downlink sub-frame, any one or more of the differently modulated data blocks may be absent. In one embodiment, MTGs 306 are 0 ("zero") PS's in duration. The frame control header 302 contains a preamble 310 that is used by the physical protocol layer (or "PHY") for synchronization and equalization purposes. The frame control header 302 also includes control sections for both the PHY (312) and the MAC (314). A FDD downlink subframe may be substantially identical to the structure of FIG. 2A, but without a Tx/Rx transition gap 308.

The downlink data PS's 304 are used for transmitting data and control messages to the CPE's 110. This data is preferably encoded (using a Reed-Solomon encoding scheme for example) and transmitted at the current operating modulation used by the selected CPE. In one embodiment, data is transmitted in a pre-defined modulation sequence: such as QAM-4, followed by QAM-16, followed by QAM-64. The modulation transition gaps 306, if present, are used to separate the modulation schemes used to transmit data. The PHY Control portion 312 of the frame control header 302 preferably contains a broadcast message indicating the identity of the PS 304 at which the modulation scheme changes. Finally, as shown in FIG. 2A, the Tx/Rx transition gap 308 separates the downlink sub-frame from the uplink subframe.

Figure 2B:
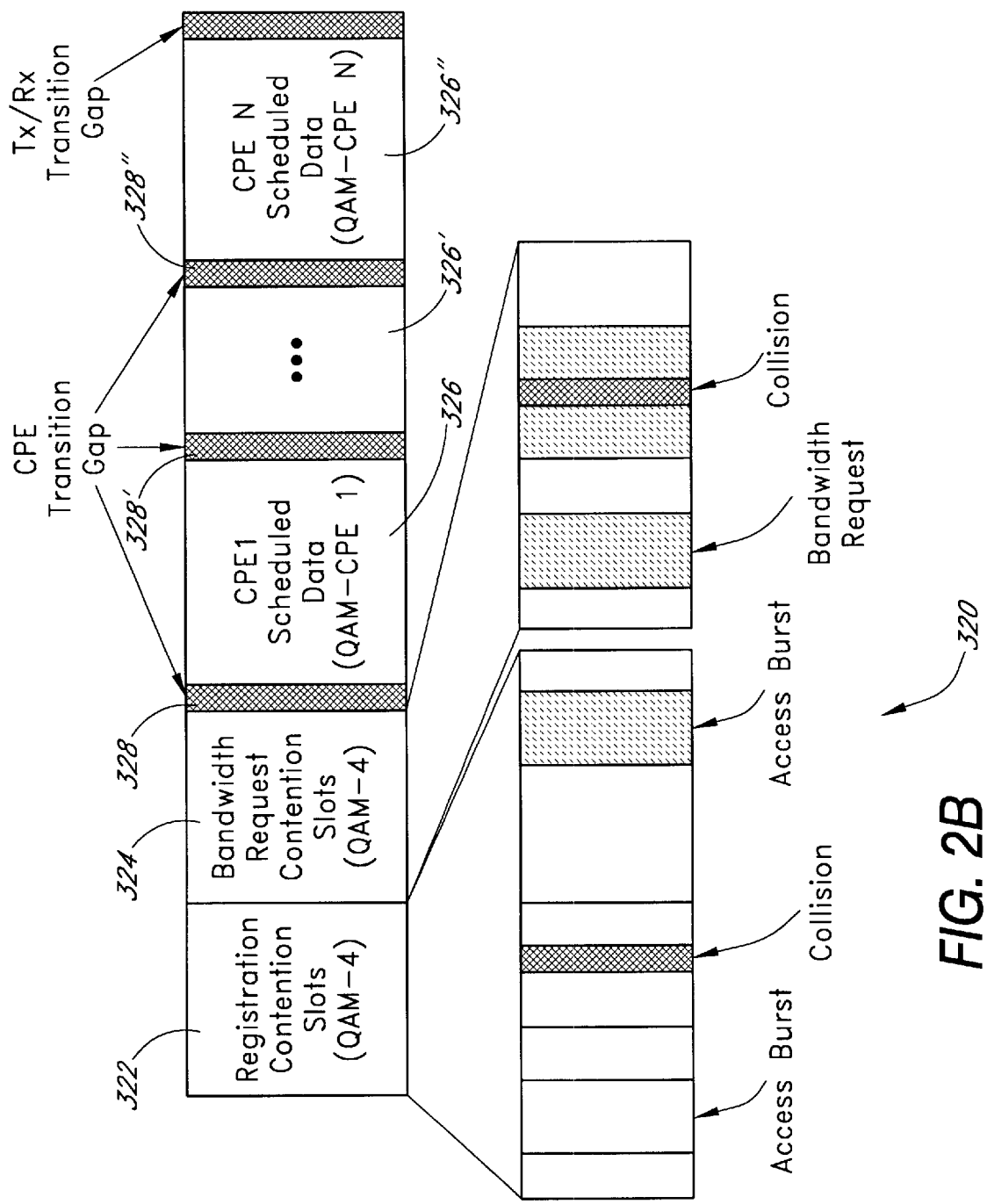
FIG. 2B shows one example of an uplink sub-frame that is adapted for use with the present communication system.

FIG. 2B shows one example of an uplink sub-frame 320 that is adapted for use with the present communication system. The CPE's 110 (FIG. 1) use the uplink subframe 320 to transmit information (including bandwidth requests) to their associated BS 104. As shown in FIG. 2B, there are three main classes of MAC control messages that are transmitted by the CPE's 110 during the uplink frame: (1) those that are transmitted in contention slots reserved for CPE registration (Registration Contention Slots 322); (2) those that are transmitted in contention slots reserved for responses to multicast and broadcast polls for bandwidth allocation (Bandwidth Request Contention Slots 324); and those that are transmitted in bandwidth specifically allocated to individual CPE's (CPE Scheduled Data Slots 326).

The bandwidth allocated for contention slots (i.e., the contention slots 322 and 324) is grouped together and is transmitted using a pre-determined modulation scheme. For example, in the embodiment shown in FIG. 2B the contention slots 322 and 324 are transmitted using a QAM-4 modulation. The remaining bandwidth is grouped by CPE. During an uplink subframe, each respective CPE 110 transmits with a fixed modulation and FEC type during their respective uplink times. The uplink sub-frame 320 includes a plurality of CPE transition gaps (CTGs) 328 that serve a similar function to the modulation transition gaps (MTGs) 306 described above with reference to FIG. 2A. That is, the CTGs 328 separate the transmissions from the various CPEs 110 during the uplink sub-frame 320. In one embodiment, the CTGs 328 are 2 physical slots in duration. A transmitting CPE preferably transmits a 1 PS preamble during the second PS of the CTG 328 thereby allowing the base station to synchronize to the new CPE 110. Multiple CPE's 110 may transmit in the registration contention period simultaneously resulting in collisions. When a collision occurs the base station may not respond. The downlink and uplink subframes provide a mechanism for layered data transportation in a wireless communication system.

Each CPE 110 requests uplink bandwidth from it's respective BS 104 by either sending a request in a bandwidth request contention slot 324, piggybacking a request in place of lower priority data, or placing a poll-me bit in the uplink data header. A CPE 110 that wasn't allotted any portion of the current uplink subframe may either request bandwidth by sending a request during the bandwidth request contention slots 324 time frame, or, alternatively, if the CPE 110 has a higher priority than another CPE 110 that was allotted uplink bandwidth, the higher priority CPE 110 may 'steal' enough bandwidth from the lower priority CPE's 110 to send a bandwidth request. If a specific CPE 110 has been allotted a portion of the current uplink subframe, but has additional data that will not fit in the allotted time, the CPE 110 may set a poll-me bit (in it's uplink header) that tells the BS 104 that the specific CPE 110 needs to be polled for more bandwidth. The CPE uplink request process will be further described in FIG. 11 below.

Figure 3:
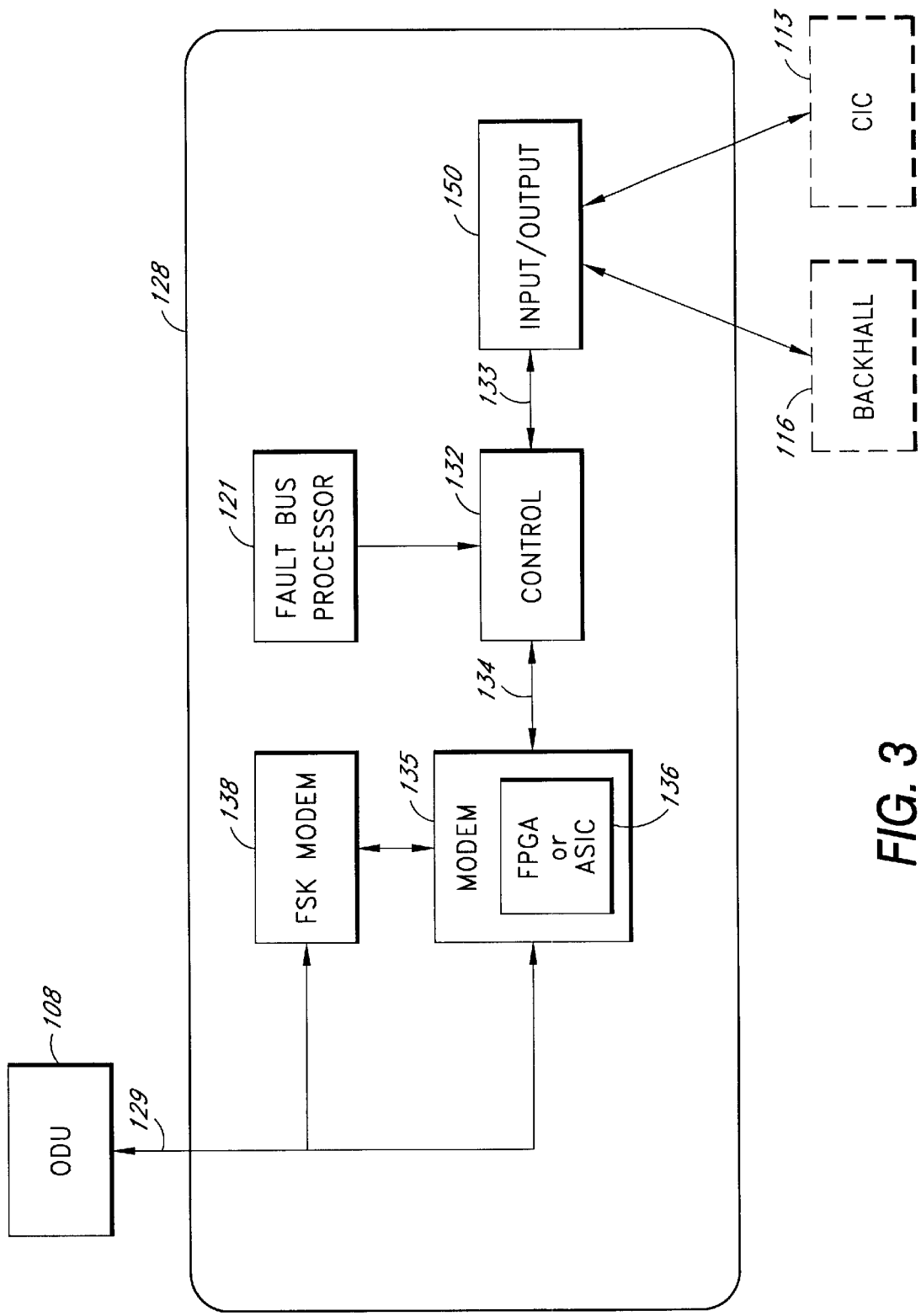
FIG. 3 is a block diagram of a Modem Interface Card including inputs and outputs thereto.

FIG. 3 is a top-level block diagram of a Modem Interface Card ("MIC"), within a BS 104. In general, the circuitry of FIG. 3 is found in the BS 104 and controls one antenna. As mentioned above, each cell that is serviced by a particular BS 104 is divided into a plurality of sectors. In one embodiment, a cell is divided in to four sectors (at ninety degree angles to one another), each of the sectors being serviced by a different antenna. FIG. 3 illustrates the circuitry within the base station, i.e. MIC 128, that is used to interface the out door unit 108 with the backhaul 116. In one embodiment, each of the four MIC 128's within the same BS 104 interface directly with the backhaul 116. In another embodiment, the backhaul 116 is split prior to coupling to any of the MIC 128's in the same BS 104.

In one embodiment of wireless communication system 100, each MIC 128 may include an input/output interface 150, a control module ("CM") 132, a modem 135, a bus 134 coupling CM 132 with modem 135, a Frequency Shift Key ("FSK") modem 138, and a fault bus processor 121. In one embodiment, these components are incorporated into a single card allowing the MIC 128 to be rack-mounted in an In Door Unit ("IDU") box, which is a standard size box used in the art. This arrangement further permits the MIC 128 to be hot swappable, which eases servicing and allows for growth. One in the art will recognize that these components may alternatively be arranged between multiple boards in multiple locations.

As illustrated in FIG. 3, the CM 132 is linked to the input/output interface 150 that attaches to the backhaul 116 and controller interface card 113. The CM 132 receives packet data from the input/output interface 150 and transmits it to the modem 135 for modulation before being sent to the Out Door Unit ("ODU") 108 through broadband cable 129, such as provided by an RG-6 cable. The CM 132 transmits data via the bus 134 to the modem 135. The modem 135 may include a Field Programmable Gate Array ("FPGA") or Application Specific Integrated Circuit ("ASIC") 136 that stores instructions for controlling other sub-components of the MIC 128. For example, the FPGA or ASIC 136 may communicate with the Frequency Shift Key ("FSK") modem 138 in order to send FSK modulated control messages from the MIC 128, through the cable 129, to the ODU 108. Similarly, the ODU 108 may respond with response messages. A fault bus processor 121 is coupled to the CM 132 and operable to report faults native to the MIC 128 to a system controller or system fault monitor 113 for further analysis.

Figure 4:
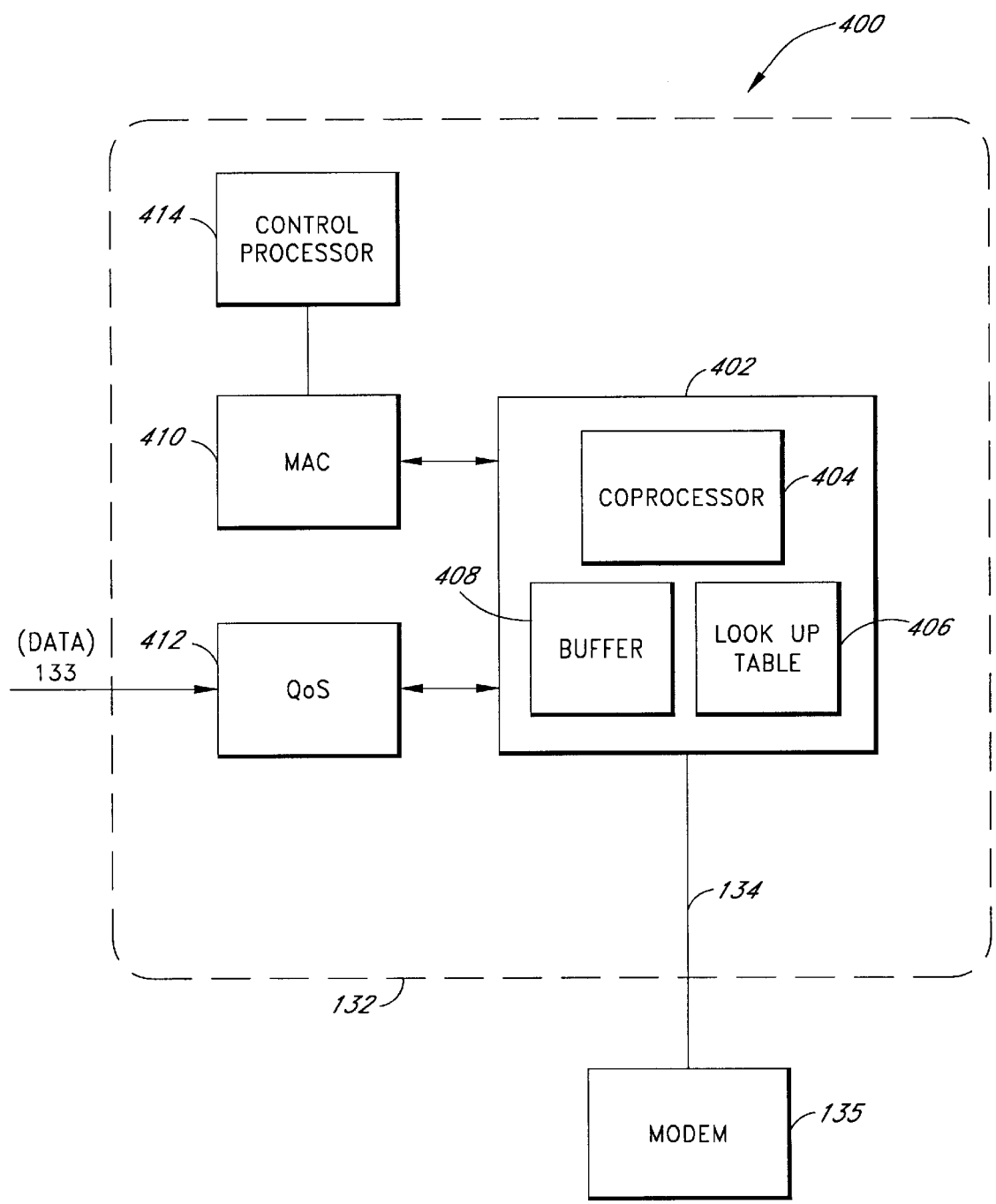
FIG. 4 is a block diagram of the Control Module within the Modem Interface Card.

FIG. 4 is a block diagram of the Control Module ("CM") 132 in the MIC 128. The CM 132 comprises, in general, a Control Processor 414 operable to execute the MAC 410 software, a Quality of Service module ("QoS") 412 operable to receive and prioritize the CPE 110 data from the input/output interface 150, and a MAC Co-Processor ("MCP") 402 operable to store and sort a data frame for output to the modem 135. The operation of each of these components will be discussed in more detail below.

In one embodiment, the data 133 arrives at the QoS 412 from the input/output interface 150. As stated above, each CPE 110 is coupled to a plurality of end user connections ("connections"), each of the connections potentially using a different broadband service. As such, each connection has an assigned priority, among other QoS parameters, which the QoS 412 uses to determine which data packets will be sent first. The QoS 412 prioritizes data 133 according to the respective QoS parameters of the connection the data packet is intended for. The QoS 412 may use these parameters in conjunction with many techniques that are well know in the art, such as fairweighted and round-robin queuing (see FIG. 6), in order to determine data priority. The MCP 402 receives PHY/MAC control and MAC protocol messages from MAC 410, pulls data packets from the QoS 412, retrieves CPE 110 settings (such as modulation and FEC) from the Look Up Table ("LUT") 406, stores the data packets in the buffer 408 until the respective time frame has terminated (ie., the predetermined period timeout has occurred), and sorts the data packets according to the modulation type, FEC type, CPE index, or connection ID of the respective connection. When the predetermined period (e.g., one millisecond) has passed, the buffered data is transferred to the modem 135.

In one embodiment, a hardware MCP 402 includes a co-processor 404 that interfaces with a hardware QoS 412 and a MAC 410 implemented with software executed by a Control Processor 414. Prior art systems typically perform the functions of both the MAC 410 and the MCP 402 using software implemented by the Control Processor 414.

In another embodiment, QoS functionality is performed by the MCP, thus removing the need for a separate QoS IC and possibly reducing the amount of physical space required to implement such a system. This alternative embodiment may implement all the functionality of the QoS module describe with regard to FIG. 6 in the MCP 402.

Figure 5:
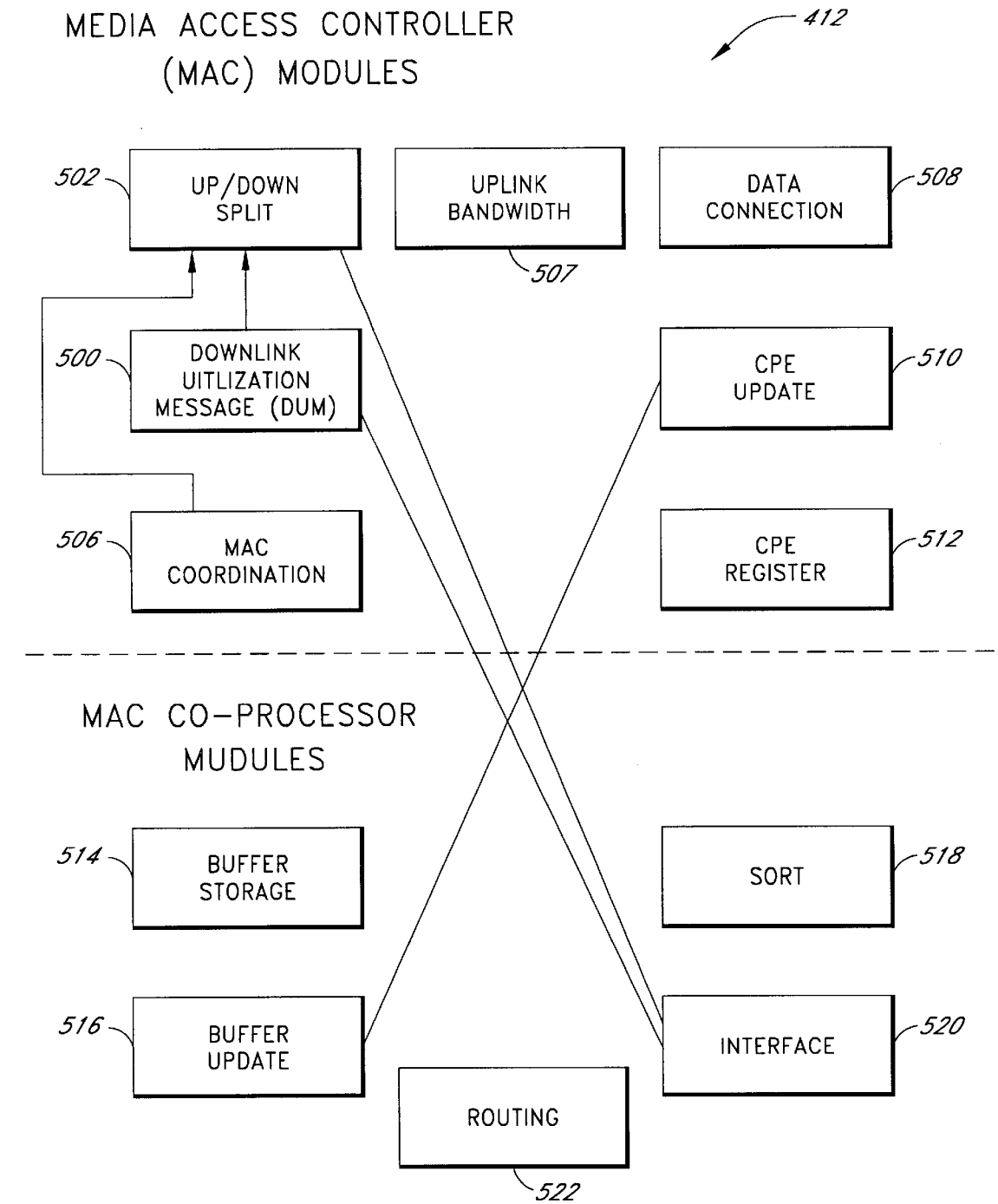
FIG. 5 is a block diagram of top-level modules that are found within the MAC and MAC coprocessor.

FIG. 5 is a block diagram of the top-level functional modules of MAC 410 and MCP 402. The term "module," as used herein, means, but is not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

MAC Modules

Referring to FIG. 5, the MAC co-ordination module 506 communicates with other MAC's 410 in the same BS 104. In general, the MAC co-ordination module 506 attempts to coordinate transmit and receive phases of all MAC's 410 in the same BS 104, such that RF interference is minimized. In one simplified embodiment, each BS 104 services a cell comprised of four equal sectors. Each of the four sectors is serviced by a separate MAC and antenna. Because the antennas may be located near one another, there is a possibility of signal interference. For example, if two antennas are servicing sectors 180 degrees apart (i.e., the antennas are back to back), interference may be more likely if one antenna is transmitting data (downlink) while the other is receiving data (uplink). According to the present invention, the MAC's 410 in a single BS 104 may co-ordinate with one another and, therefore, decrease signal interference.

In an ATDD or TDD system, the MAC co-ordination module 506 provides information to the up/down split module 502 which will be used in determining the up/down split. In one embodiment, each MAC 410 in a single BS 104 uses the same up/down split. In another embodiment, only those MAC's 410 that control antennas that service opposite sectors (i.e., antennas that are 180 degrees apart) use the same up/down split. In yet another embodiment, each MAC 410 in the BS 104 determines an up/down split independent of other MAC's 410 in the same BS 104. Other methods of coordinating a MAC up/down split among multiple MAC's 410 may also be used by MAC co-ordination module 506.

In a FDD system, the MAC co-ordination module 506 allows MAC's 410 in a specific base station to coordinate their transmit and receive schedules. For example, in one embodiment, adjacent antennas transmit and receive during alternate time periods. In another embodiment, the antennas that service opposite sectors (ie., antennas that are 180 degrees apart) may transmit and receive during alternate time periods. In yet another embodiment, the MAC co-ordination module 506 may only allow one antenna in a certain base station to transmit or receive at any point in time.

In a TDD system, the Downlink Utilization Message ("DUM") Module 504 receives a DUM from the MCP 402 indicating the amount of data sent in the last transfer frame and providing an indicator to the MAC 410 of how well the MAC 410 estimated the previous up/down split. As stated above, the MAC 410 does not know how much data is actually waiting to be downlinked and uplinked, but only estimates based on the factors discussed herein. Within the MCP 402, if a data frame is not full when one millisecond (or other predetermined period) has passed, the data must still be sent to the modem 135. As such, a downlink subframe may be completely full, partially full, or completely empty when sent to the modem 135. After each data frame has been sent to the modem 135, the MCP 402 sends a DUM to The DUM Module 504 (in MAC 410). The DUM Module 504 may then utilize the DUM in order to negotiate for a different up/link split on the subsequent data frame.

In a TDD system the up/down split Module 502 determines the amount of downlink data that will be allowed in the current data frame. For example, in one embodiment each data frame has a time frame of one millisecond. Depending on several factors, discussed below, the up/down split Module 502 may allot 500 microseconds to downlink and 500 microseconds to uplink, i.e., an even split between downlink and uplink. In a subsequent time frame, the up/down split module 502 may need to allot 700 microseconds to downlink and only 300 microseconds to uplink.

The up/down split Module 502 has several inputs that are utilized in determining the up/down split. Two such inputs are received from the Downlink Utilization Message ("DUM") Module 504 and the MAC co-ordination module 506 discussed above.

In addition to the preceding inputs, other CPE settings, such modulation and quality of service requirements, may be stored and referred to by the up/down split module 502 in determining the up/down split. For example, if the MAC 420 receives an unexpectedly high volume of uplink bandwidth request from CPE's 110, the up/down split module 502 may allocate more time for the uplink sub-frame.

The up/down split module is only found in a TDD system. A FDD system uses the same, predetermined period, for both downlink and uplink data frames. Although the downlink and uplink data frames are not necessarily sent during the same predetermined period, the data frames are always the same length.

The data connection module 508 establishes connections as instructed by call control software. Each data connection is established by the BS 104 towards the CPE 110. As discussed above, each connection may have different QoS settings. The call control software turns on connections using the particular QoS settings for that particular connection.

The CPE update module 510 updates both a master copy of CPE settings in the MAC 410 and a copy of CPE settings in the LUT 406. The CPE settings are initially stored when a new CPE 110 registers with the MAC 410. The CPE settings are subsequently updated, in both the MAC 420 and the LUT 406, when a specific CPE 110 requests a change or the CPE update module 510 initiates a change. CPE settings include, among others, modulation type, FEC type, encryption ON/OFF flag, encryption key, and key number particular to each CPE 110. The MCP 402 accesses CPE settings stored in the LUT 406 (and updated by CPE update module 510) in order to generate physical layer information that will be transmitted to the modem 135.

CPE settings ensure that each CPE 110 receives its' respective data securely (i.e., only the intended CPE 110 receives the data) using the most efficient modulation. In one embodiment, each CPE 110 uses a unique encryption key. The BS 104 call control determines whether encryption should be on or off, and, when encryption is on, call control selects an encryption key. The encryption key is an 8 5 byte code, that is used to encrypt and decrypt information sent to and from both the BS and CPE's 110. The encryption key is periodically changed in both the BS 104 and specific CPE's 110, according to instructions by the BS 104 call control. In one embodiment, a communication system uses two different encryption keys which are indexed by encryption key numbers (e.g., encryption key number one and encryption key number two). In other embodiments, any number of different encryption keys may be used and indexed by corresponding encryption key numbers. When an encryption key change is performed, the encryption key number is incremented and the encryption key corresponding to the new (i.e., incremented) key number is used. Thus, when an encryption key change is indicated by call control, the BS 104 and the particular CPE 110 may simultaneously change to the same encryption key.

Each CPE 110 may use various modulations, such as QAM-4, QAM-16, and QAM-64, and various FEC schemes, such as Reed-Solomon, convolutional, and turbo coding. All three modulation types may be transmitted in a single data frame by and to different CPE's. In a given frame, a single CPE 110 may transmit in more than one modulation group. For example, a specific CPE 110 may send data during a QAM-4 modulation period and send data during a subsequent QAM-64 modulation period within the same time frame. The MCP 402 uses CPE settings stored in the LUT 406 to append the current CPE's data with modulation and FEC information for the modem, thus ensuring that each CPE is able to detect and receive data intended for the specific CPE.

The CPE Registration module 512 controls the registration of new CPE's. The CPE 110 population in a sector is relatively static, such that CPE's 110 will join the system infrequently, and once joined, they usually stay with the system indefinitely. Bandwidth must be allocated for registration of new CPE's 110, but due to the relatively static nature of the CPE 110 population, the registration opportunities may be infrequent, and do not need to occur in every time frame, but some multiple of frames. As part of the registration process, the CPE 110 must achieve downlink synchronization with BS 104. Once downlink synchronization is achieved, the CPE 110 must go through a ranging process to obtain the correct timing advance for uplink transmissions. The ranging process may also affect the choice of modulations available to a particular CPE 110 in order to ensure a certain quality of transmission. Once a CPE 110 is successfully registered, a series of CPE settings are stored in both the MAC 410 and the LUT 406.

The uplink bandwidth module 507 receives bandwidth request from CPE's 110 and allocates the available uplink sub-frame among the received requests. Uplink bandwidth allocation is very similar to downlink bandwidth allocation (discussed below in reference to the prioritize module 602). The data queues, however, reside distributed across the individual CPE's 110. Rather than check the queue status directly, the MAC 420 receives requests for bandwidth from the CPE's 110. Using these requests, the MAC 420 reconstructs a logical picture of the state of the queues. Based on this logical view of the set of queues, the MAC 420 allocates uplink bandwidth in a similar way as it allocates downlink bandwidth. The bandwidth allocated to a particular CPE 110, however, is sent in the form of a bandwidth allocation in an uplink map. The uplink map allocates a certain amount of bandwidth to a particular CPE 110, starting at a certain point in the next time frame. The particular CPE 110 then allocates this bandwidth across its connections. Due to the dynamic nature of bandwidth allocation, the allocations are constantly changing, such that a CPE 110 may receive unsolicited modifications to the bandwidth granted on a frame by frame basis. If a CPE is allocated less bandwidth for a frame than is necessary to transmit all waiting data, the particular CPE 110 must use its' QoS and fairness algorithms to service its queues. In addition, the particular CPE 110 may steal bandwidth from lower QoS connections to piggyback a request for more bandwidth.

MCP Modules

The Buffer storage module 514 accumulates user data from the QoS 412 and associated MAC protocol messages from the MAC 410 for a single time. This accumulated information is stored in a buffer 408, such as a RAM. When a time frame has expired, the contents of the buffer 408 are transferred to modem 135.

The Sort module 518 sorts data received from the QoS 412 according to any one, or combination of, the following: modulation type, FEC type, CPE index or connection ID. For example, in one embodiment data packets may be sorted first according to end user connection ID, then according to CPE index, and finally according to modulation type. In one embodiment that sorts according to modulation type, the buffer 408 may be divided in to three separate portions labeled QAM-4, QAM-16, and QAM-64. It is contemplated that other modulation types may be used in the future, and, thus sort module 518 may sort according to these different modulation types. In another embodiment that sorts according to FEC type, the buffer 408 may be divided in to three separate portions labeled RS, convolutional, and turbo code. In yet another embodiment the buffer may be divided in to a plurality of portions in order to sort according to the connection ID associated with each respective data packet. The detailed description and figures herein describe a system that sorts according to modulation type. One of ordinary skill in the art may adapt the described system to sort according to other criteria, such as modulation type, FEC type, CPE index or connection ID, for example.

When a data packet is received by the MCP 402, the CPE settings corresponding to that data packet are retrieved from the LUT 406. As stated above, modulation type is one of the CPE settings. The received data packet is then stored in the portion of the buffer 408 that corresponds to the selected modulation type of the particular CPE 110. This process is repeated for each data packet received by the MCP 402 and effectively sorts the data frame according to modulation type.

The MCP 402 must calculate, after each data packet is received, how many physical slots (PS) will be used by the current data packet, and how may physical slots remain in the current downlink subframe. More specifically, before a downlink subframe is filled with data, the MCP 402 initially determines how may PS's are available in the current downlink sub-frame. In an ATDD system, the number of PS's may vary on each time frame, while in an FDD system, the number of PS's may remain constant. The MCP 402 then determines how many PS's each data packet will require. This determination is made when a specific data packet is pulled from the QoS 412 and the modulation type is read from the LUT 406. The number of PS's required by a specific data packet may be different depending on the modulation type required for the specific data packet. For example, a specific data packet may require N PS's if transmitted in QAM-4, N/2 PS's if transmitted in QAM-16, and N/3 PS's if transmitted in QAM 64. In addition, the FEC type used by specific CPE's 110 may also change the number of required PS's, and, thus must also be included in the calculation. Once the MCP 402 has determined how many PS's the current data packet requires, at the current CPE's modulation, this amount is subtracted from the total number of PS's available in the downlink sub-frame, and becomes the new number of PS's available in the downlink sub-frame. This process is repeated for each data packet received from the QoS 412 until the MCP 402 determines that the data frame is ready to be sent.

The buffer update module 516 appends the CPE settings to respective CPE data stored in the buffer 408. The CPE settings are read from the LUT 406, and may include, among others, modulation type, encryption ON/OFF, key number, and encryption number. The buffer update module 516 uses the most current CPE settings, as updated by the CPE update module 510. The buffer update module 516 also inserts modem control data in to the data frame stored in the buffer 408. For example, the first or last cell of each modulation type and the number of RS blocks in each modulation type must be indicated. This information is used to fill in the downlink map in the PHY control 312 portion of the frame control header 300.

In one embodiment, the CPE's 110 and the MCP 402 may perform three reciprocal operations on transmitted data packets, namely packing/unpacking, payload header suppression/payload header reconstruction and fragmentation/defragmentation. For example, if a specific CPE 110 is packing data, the MCP 402 will unpack the data.

Packing of downlink data packets may occur when multiple data packets are destined for the same end user connection. When packing is not used each data packet is prefixed by a MAC header. When a plurality of data packets are destined for the same end user connection the repetitive MAC headers may not be needed and may waste bandwidth. Therefore, when a plurality of data packets are destined for the same end user connection, the MCP 402 may include in the first data packet's MAC header, or in the packet itself, information sufficient to determine the number of following data packets destined for the same end user connection. This eliminates the need for MAC headers on the following data packets destined for the same end user connection and may provide additional bandwidth for other data. When downlink data is packed, the receiving CPE 110 unpacks the data by recreating the MAC headers for each individual data packet. CPE's 110 may also pack data, to be unpacked by the MCP 402.

Payload header suppression may be performed when a higher layer packet has it's own header, i.e. a header that is not created or used by the MCP or CMCP, that doesn't need to be completely downlinked. Payload header suppression removes a portion of the higher level header, which may then be reconstructed by the receiving CPE 110. When the MCP 402 performs payload header suppression, the CPE 110 performs payload header reconstruction, and vice versa.

Fragmentation may be performed when a higher layer packet cannot fit in to a downlink subframe. The higher layer packet may be fragmented for transmission over a series of two or more time frames. For example, a specific data packet received from the QoS may fill N complete downlink sub-frames. Instead of allotting all available downlink bandwidth to that specific data packet for N time frames, the MCP 402 may allot a fraction F (½ for example) of the downlink bandwidth to the specific data packet, such that the specific data packet now requires N*1/F time frames to downlink the data packet, but other data packets may use the remaining fraction (1−F) of the bandwidth during that same period. The receiving CPE 110 will defragment the fragmented portions to form the entire higher layer data packet. In a similar manner, the CPE 110 may fragment data which the MCP 402 will defragment.

The MCP 402 may also perform partial SARing of data packets. When the CPE 110 receives ATM cells, the MCP 402 may convert the ATM cells into variable length MAC packets. The MCP 402 may receive ATM cells that encapsulate a higher layer protocol, such as IP. The MCP 402 may concatenate the payload of the ATM cells and send it as a variable length MAC packet.

The interface module 520 provides the MCP 402 with an interface between the modem 135, the MAC 410, and the QoS 412. As discussed above, the modem 135 receives the contents of the buffer 408 each one millisecond. The interface module 520 allows the MAC 410 to interface with the MCP 402 by sending the current up/down split, the PHY/MAC control message, and MAC protocol messages from the MAC 410 to the MCP 402 and sending the current DUM from the MCP 402 to the MAC 410. The QoS 412 transmits user data to the MCP 402 through the interface module 520.

The routing module 522 receives uplink data from CPE's 110 and routes the data to the proper location. The routing module 522 determines if the data is MAC protocol data or user data to be forwarded to the input/output interface 150. This determination is accomplished using the connection ID, as assigned by the BS call control, which is included in each packet header. If the data is MAC protocol data, the data is forwarded to MAC 410 for processing. Alternatively, if the data is user data which eventually needs to reach the backhaul 116, the data is forwarded to the input/output interface 150.

QoS Modules

Figure 6:
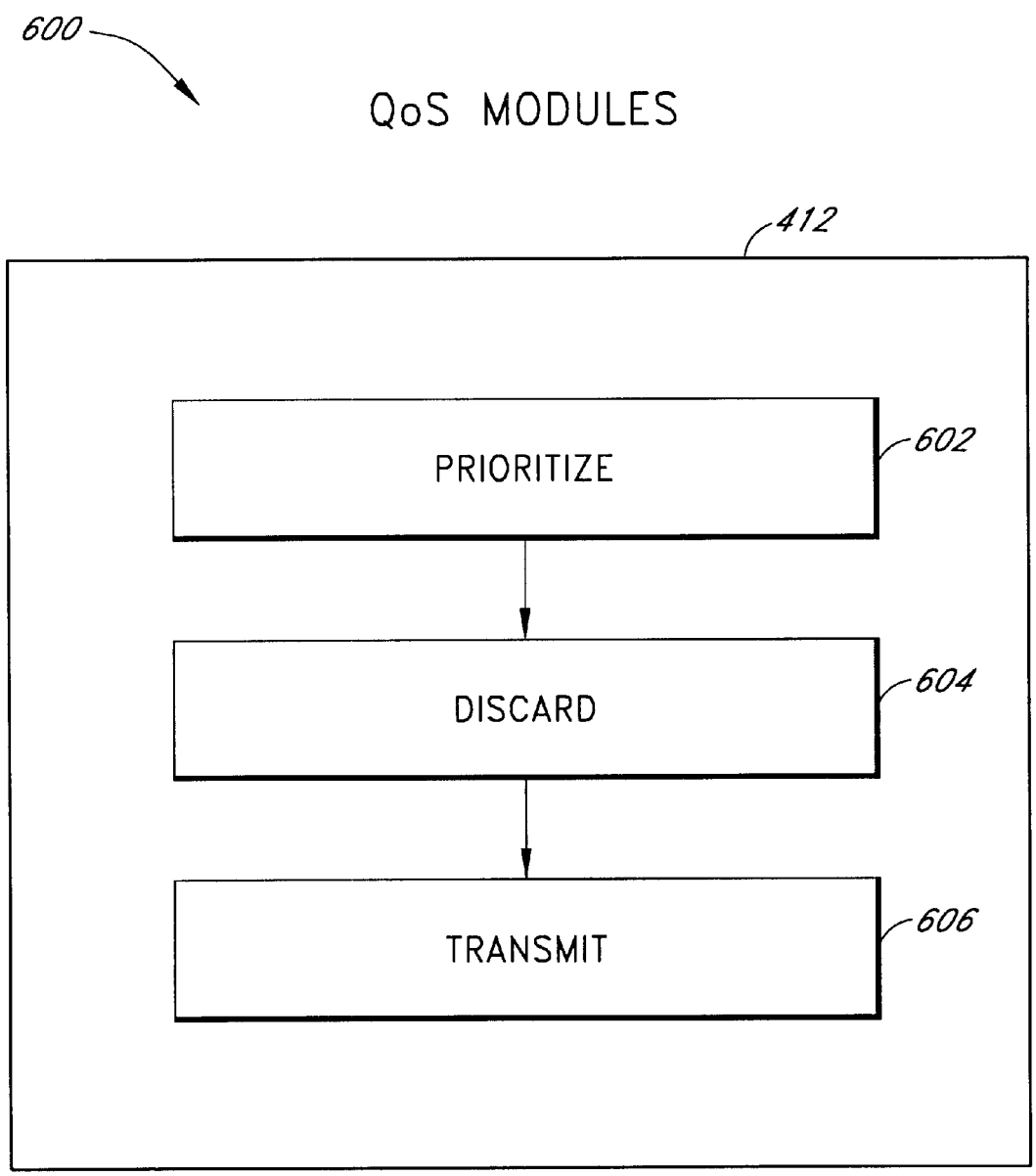
FIG. 6 is a block diagram of top-level modules that are found within the Quality of Service module.

FIG. 6 is a block diagram of the top-level modules within QoS 412.

The prioritize module 602 uses a specific fairness algorithm to prioritize the send order of data according to each connection's respective QoS parameters, including a priority level. As each data packet exits the QoS 412 it is prepended with a 10 bit CPE index that identifies the particular CPE 110 that is to receive the particular data packet. In one embodiment, there are three basic fairness algorithms that are implemented, namely: Continuous Grant, Fair weighted and Round Robin queuing. However, more or fewer algorithms may be used depending, for example, on the types of services or connections available, the number or types of connections, etc.

Continuous Grant ("CG") queues may have the simplest fairness algorithm. All data in these queues must be sent every frame. If there is insufficient bandwidth, the discard module 604 intelligently discards data.

Fair weighted queuing requires that all connections at a particular quality of service have a weight assigned to them to determine the percentage of the available bandwidth they are eligible to receive. The weight is derived from one of three data rate parameters, depending upon the contractual parameters of the provisioned connection. These parameters may include (1) data pending, (2) guaranteed rate, and (3) average rate. In one embodiment, the weight for a particular connection is the amount of data pending for the connection, expressed as a percentage of the total data pending in the queue. Since the amount of data pending is dynamic, the weights for these types of queues must be recalculated every frame where there is insufficient bandwidth to send all data in the affected queue. When using fair weighted queuing, the granularity of the bandwidth allocation may be too coarse to allow a perfect percentage-based weighted allocation across the connections in the queue. This may result in some queues not receiving any bandwidth in a particular frame. To ensure that the occurrence of this condition is fairly distributed across the connections in the queue, the connections that did not receive bandwidth are given priority the next time the insufficient bandwidth condition exists for the queue. For queues with weights based upon guaranteed or average rates, some connections may not have sufficient data pending to use all the bandwidth they are entitled to based upon their calculated weight. In these cases, the connection's unused bandwidth (within the limits of the allocation granularity) is fairly distributed across the connections with excess data pending.

The Round Robin fairness algorithm is used for best effort connections where all connections have equal weight. When insufficient bandwidth exists to transmit all data in the queue in a particular frame, connections are allocated bandwidth in a round robin fashion with each connection receiving a block of bandwidth up to a queue specific maximum. Connections that did not receive bandwidth are given priority the next time the insufficient bandwidth condition exists.

The discard module 604 intelligently discards the lowest priority data if the QoS 412 has received more data than will fit in the QoS buffer. In one embodiment the QoS buffer is large enough to hold enough data to fill a plurality of data frames.

The transmit module 606 forwards the highest priority data packets to the MCP 402, upon request by the MCP 402. These requests are made whenever data is needed to fill the downlink portion of the current data frame.

The Downlink Process

Figure 7:
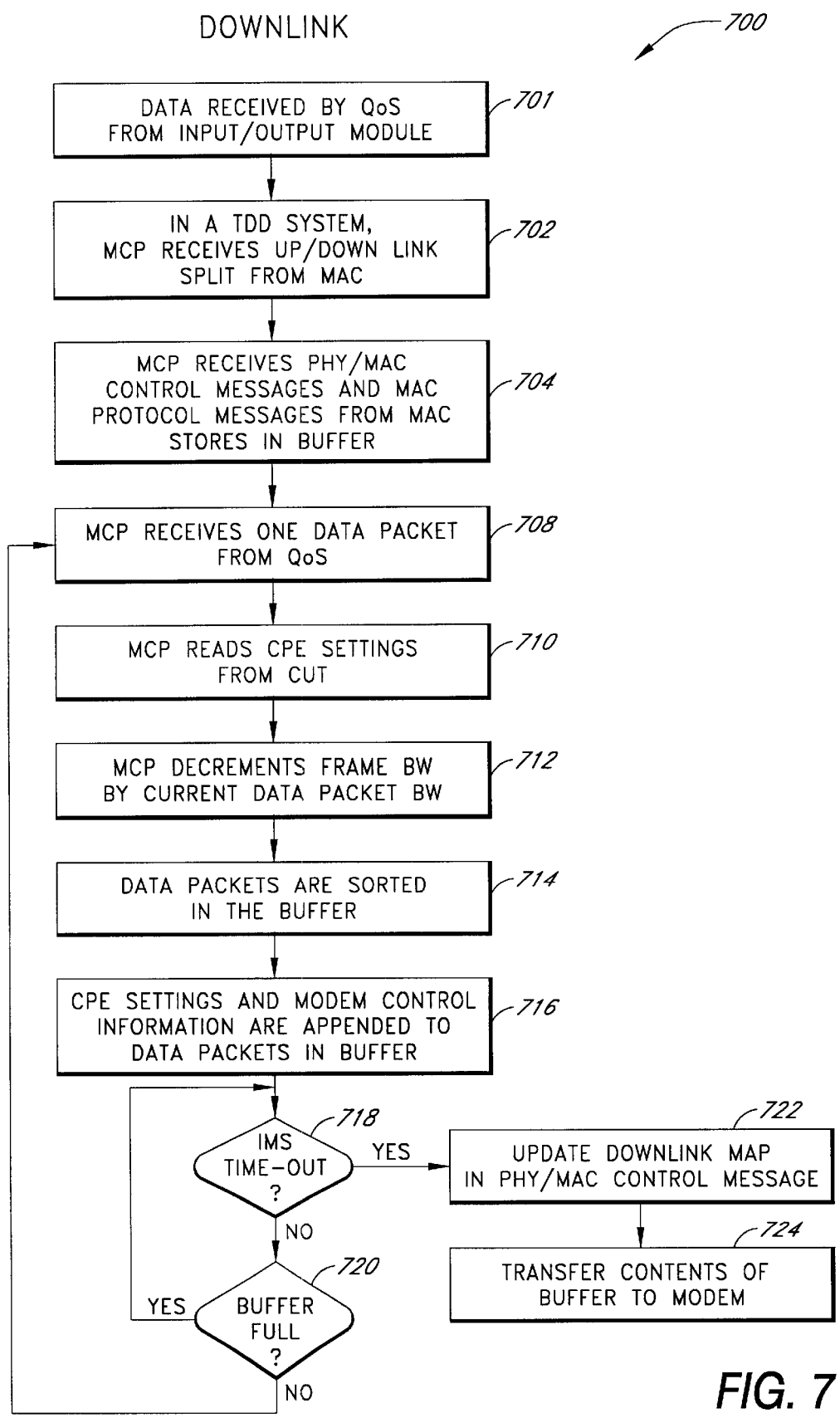
FIG. 7 is a flowchart of the downlink process.

FIG. 7 is a flowchart showing the downlink process implemented by MCP 402.

In step 701, data is received by the QoS 412 from the input/output interface 150.

In step 702, in a TDD system the MCP 402 receives up/down split information from the MAC 140. The up/down split is determined by the MAC 140 as described above in reference to the up/down split module 502.

After the MCP 402 knows how much downlink time is available, the MCP 402 may calculate the total number of PS's available. This total number of PS's may be important in determining how much data can be sent at varying modulations and FEC types.

In step 704, the MCP 402 receives a PHY/MAC control message and MAC protocol messages from the MAC 140. The PHY/MAC control message is broadcast to all CPE's 110 in the sector and may include information regarding the physical layer, maximum transmit timing advance, downlink modulation transition points, end of downlink point, end of frame point, and frame/multiframe/hyperframe numbering. In an alternative embodiment, the PHY/MAC control messages may be determined by the MCP, which may remove additional overhead from the MAC 140 software.

In one embodiment, the PHY/MAC control message is RS encoded, transmitted using QAM-4 modulation, but is not encrypted. QAM-4 modulation may be used to ensure that all CPE's 110 are able to demodulate the control messages. In another embodiment, the encoding, encrypting, and modulation type are specific to each BS 104 MAC 140. When the PHY/MAC control message is received by MCP 402, it is immediately placed in the buffer 408 for later transmission to the modem 135 (discussed below). In one embodiment, the PHY/MAC control message is placed at the beginning of the QAM-4 section of the buffer 408. Portions of the PHY/MAC control message stored in the buffer 408 may later be updated, in step 722, according to the actual content of the buffer 408 immediately before transfer to the modem 135 in step 724.

MAC protocol messages are sent to only single CPE's 110 according to the particular CPE settings. Because a MAC protocol message is intended for a specific CPE 110, transfer frame bandwidth may be conserved by transmitting the MAC protocol message using the modulation and/or FEC settings of the specific CPE 110. For example, a particular CPE 110 that uses QAM-64 modulation is also capable of using QAM-16 and QAM-4 modulation. Instead of modulating a protocol message intended for this particular CPE using QAM-4, though, bandwidth is conserved by using the more bandwidth efficient QAM-64 modulation. MAC protocol messages are given the highest priority, which means they are always at the beginning of the appropriate modulation group. Because they are given the highest priority, each BS MAC 410 may set a limit on the number of protocol messages allowed per data frame (10, for example). While very few MAC protocol messages are typically needed, limiting the number per data frame may prevent filling an entire data frame, or modulation group within a data frame, with protocol messages, and excluding all user data. When the MCP 402 receives MAC protocol messages, they are immediately stored in the buffer 408 according to the modulation type of the intended CPE 110. MAC protocol messages may be divided into six subcategories, namely, registration, physical layer maintenance, connection maintenance, security, load leveling, and general. The registration subcategory may include registration and ranging messages sent from the CPE 110 to the MAC 410 and registration results, ranging results, re-register, and registration collision messages sent from the MAC 410 to the CPE 110. The physical layer maintenance subcategory may include change modulation, change FEC, Tx advance change, and power adjustment messages from the MAC 410 to the CPE 110 and modulation change acknowledgement, FEC change acknowledgement, Tx advance change acknowledgement, power adjustment acknowledgement, and downlink modulation change request messages from the CPE 110 to the MAC 410. The connection maintenance subcategory may include bandwidth request and multicast assignment acknowledgement messages from the CPE 110 to the MAC 410 and a multicast assignment message the MAC 410 to the CPE 110. The security subcategory may include a key sequence message from the MAC 410 to the CPE 110 and a key sequence acknowledgement from the CPE 110 to the MAC 410. The load leveling subcategory may include a channel change message from the CPE 110 to the MAC 410 and a channel change acknowledgement the MAC 410 to the CPE 110. The general subcategory may include a general message that may be sent in either direction, i.e. to the MAC 410 from the CPE 110 or from the MAC 410 to the CPE 110.

In step 708, the MCP 402 receives one data packet from the QoS 412, including a CPE index which is prepended to the data packet. The QoS 412 holds downlink data in queue for MCP 402 to pull data packets from. Step 708 begins the data frame loop (steps 708 through 720) that systematically fills each data frame. The coprocessor 402 controls the operations of the MCP 132 through steps 708–720. If there is no data queued by the QoS 412, the MCP 402 will wait for data to become available until the current one millisecond time frame is complete. At that point, the MCP 402 will transmit whatever data is currently in the buffer 408 to the modem 135 (this process discussed below).

In step 710, in a first embodiment, the MCP 402 uses the CPE index from the received data packet in order to access the appropriate CPE settings in the LUT 406. In a second embodiment, the QoS functionality is perform by the MCP 402, such that the data packets are received by the MCP 402 directly from input/output 150 and the MCP 402 uses the connection ID to determine the appropriate CPE settings to pull from the LUT 406.

As stated earlier, the LUT 406 is updated by the MAC 410 and may contain the CPE 110 specific information, such as modulation type, FEC type, encryption ON/OFF flag, key number, and encryption key. The MCP 402 may now calculate the exact number of PS's required for the current data packet at the specified modulation (the modulation from the LUT 406 corresponding with the destination CPE 110).

In step 712, the MCP 402 decrements the current available downlink bandwidth by the current data packet bandwidth. More specifically, this calculation is performed by subtracting the number of PS's required by the current data packet at the specified CPE 110 modulation from the number of PS's available in the downlink sub-frame. This calculation must be performed using PS's instead of raw size (e.g. number of bytes) because the number of PS's required by each specific CPE 110 is dependant on that specific CPE's 110 modulation type. For example, a specific data packet may require N PS's if transmitted in QAM-4, N/2 PS's if transmitted in QAM-16, and N/3 PS's if transmitted in QAM 64. In addition, the FEC type used by specific CPE's 110 may also change the number of required PS's, and, thus, must also be included in the calculation. The resulting number of PS's remaining will be used in step 720 by the MCP 402 to determine if the current data frame is full.

Between steps 710 and 714, the MCP performs any combination of packing, payload header suppression, and fragmentation. As discussed above, packing, payload header suppression and fragmentation may be used increase the efficiency of the communication system.

In step 714, the received data packet is stored and sorted in the buffer. Data packets may be sorted according to any combination of the following: modulation type, FEC type, CPE index, and end user connection ID. For example, in one embodiment data packets may be sorted first according to end user connection ID, then according to CPE index, and finally according to modulation type. In another embodiment, data packets may only be sorted according to FEC type. In yet another embodiment, data packets may be sorted first according to CPE index and then according to FEC type. It is contemplated that any combination of the listed sort criteria (modulation type, FEC type, CPE index, and end user connection ID) may be used.

In the example of FIG. 7, the data packets will be sorted according to modulation type. In this embodiment, the sorting may be accomplished by MCP 402 sending the received data packet to one of three portions of a buffer 408 divided in to QAM-4, QAM-16, and QAM-64 portions. Using the CPE settings retrieved in step 710, the MCP 402 stores the current data packet in the portion of buffer 408 that corresponds with the modulation type selected by the current CPE 110.

In step 716, the CPE settings and modem control information are appended to data packets in the buffer 408. The CPE settings that are read from the LUT 406 corresponding to the current CPE 110 are stored in the buffer 408 next to the received data packet that was stored in buffer 408 in step 714. Accordingly, the CPE settings may be stored in any of the three portions of buffer 408 depending on the modulation type of the current CPE 110. Modem control information is also appended to the received data packet stored in the buffer 408.

In step 718, the MCP 402 determines if a predetermined period timeout (one millisecond, for example) has occurred. The communications system 100 uses a static time frame in order to keep all BS MAC's 410 and CPE's 110 in the cell synchronized. In the event that the buffer 408 is not completely full when the one millisecond timeout has occurred, the data already in the buffer must be sent in order to preserve the synchronicity of the system. In one embodiment, if the buffer 408 is not full when a timeout has occurred, the modem 135 pads the empty data blocks with fill cells or bytes in order to preserve the timing between modulation groups. In another embodiment, the MCP 402 pads the empty data blocks in the buffer 408 before sending the data frame to the modem 135 (step 724).

According to step 718, the MCP 402 determines if a one millisecond timeout has occurred. If the timeout has not occurred the method flow continues to step 720, wherein MCP 402 determines if buffer 408 is full.

In step 720, the MCP 402 uses the calculation from step 712 to determine if the buffer 408 is full (i.e., contains enough data to fill the downlink subframe). This determination is made using the number of PS's remaining to be filled (as determined in step 712). If the MCP 402 determines that the buffer 408 is full, the method flow returns to step 718, where MCP 402 will wait for the one millisecond timeout to occur. In the case that the buffer 408 is full before the one millisecond timeout occurs, the MCP 402 will repeat the decision blocks of 720 and 718 until the one millisecond timeout occurs. Alternatively, if the buffer 408 is not full, the method flow returns to step 708, wherein the MCP 402 receives another data packet from the QoS 412. Thus, the MCP 402 will continue the loop between 708 and 720 until either the buffer 408 is full or the one millisecond timeout occurs.

According to step 718, if a one millisecond timeout has occurred the method flow continues to step 722, wherein the MCP 402 updates the downlink map portion of the PHY/MAC control message in the buffer 408 before transmitting the data.

In step 722, the MCP 402 updates the modulation breaks or FEC transitions in the PHY/MAC control message. In a TDD system, the up/down split received by the MCP 402 in step 702 was an estimation of the expected up/down split. The MAC 410 doesn't know how much data is actually waiting on the QoS 412 for transmission, but uses other factor (discussed above in reference to the MAC up/down split module 502) in order to determine a preliminary up/down split. Only when the one millisecond timeout occurs does the MCP 402 know how much downlink data will be included within the allotted downlink bandwidth. In one aspect, the up/down split received in step 702 acts as an upper limit, or, in other words, as a limit to the amount of downlink data allowed in the current data frame. If a particular data frame is not full when the timeout occurs, the MCP 402 may update the up/down split. When the up/down split is updated, i.e. the downlink sub-frame is shortened, there will be a period of time between downlink and uplink when no data is either transmitted or received by the BS 104. This transmission free period can reduce interference in the overall system. This transmission free period can fill the remaining portion of the downlink. Because the up/down split has been updated, each of the receiving CPE 110's may disregard any noise in this intermediate time frame. Thus, the update of the up/down split prevents CPE's 110 from mistaking noise between the downlink and uplink sub-frames as transmitted data. Accordingly, the downlink map may be updated in step 722.

Step 722 also allows the MCP 402 to update modulation and FEC transition points in the outgoing data frame in both TDD and FDD systems. In a similar fashion as discussed above, neither the QoS 412 or the MAC 410 knows how much data will be transmitted in each modulation group. Accordingly, only after the predetermine period timeout has occurred can the MCP 402 know the actual locations of modulation transition. For example, in a particular data frame, if the buffer 408 is full with 10% QAM-4 data, 10% QAM-16 data, and 80% QAM-64 data, the modulation transition points will indicate that the first 10% of the time frame is QAM-4 data, the following 10% of the time frame is QAM-16 data, and the remaining 80% of the time frame is QAM-64 data. Accordingly, step 722 allows the MCP 402 to update modulation transitions, within the buffer 408, such that the modulation transitions are described. Because the modulation transitions are part of the PHY/MAC control message which all CPE's 110 receive, each CPE 110 is aware of the starting locations of each modulation group. In an embodiment that sorts data according to FEC, the above process is used to update FEC transition points. In yet another embodiment, a system may sort data according to any combination of modulation and FEC types. In such an embodiment, a sorting process similar to that discussed above may be used.

In step 724, all data in the buffer 408 is transferred to the modem 135. As a result of the preceding steps, the data now includes all of the information necessary for the modem 135 to correctly send the data such that each receiving CPE 110 may efficiently receive their respective data.

Figure 8:
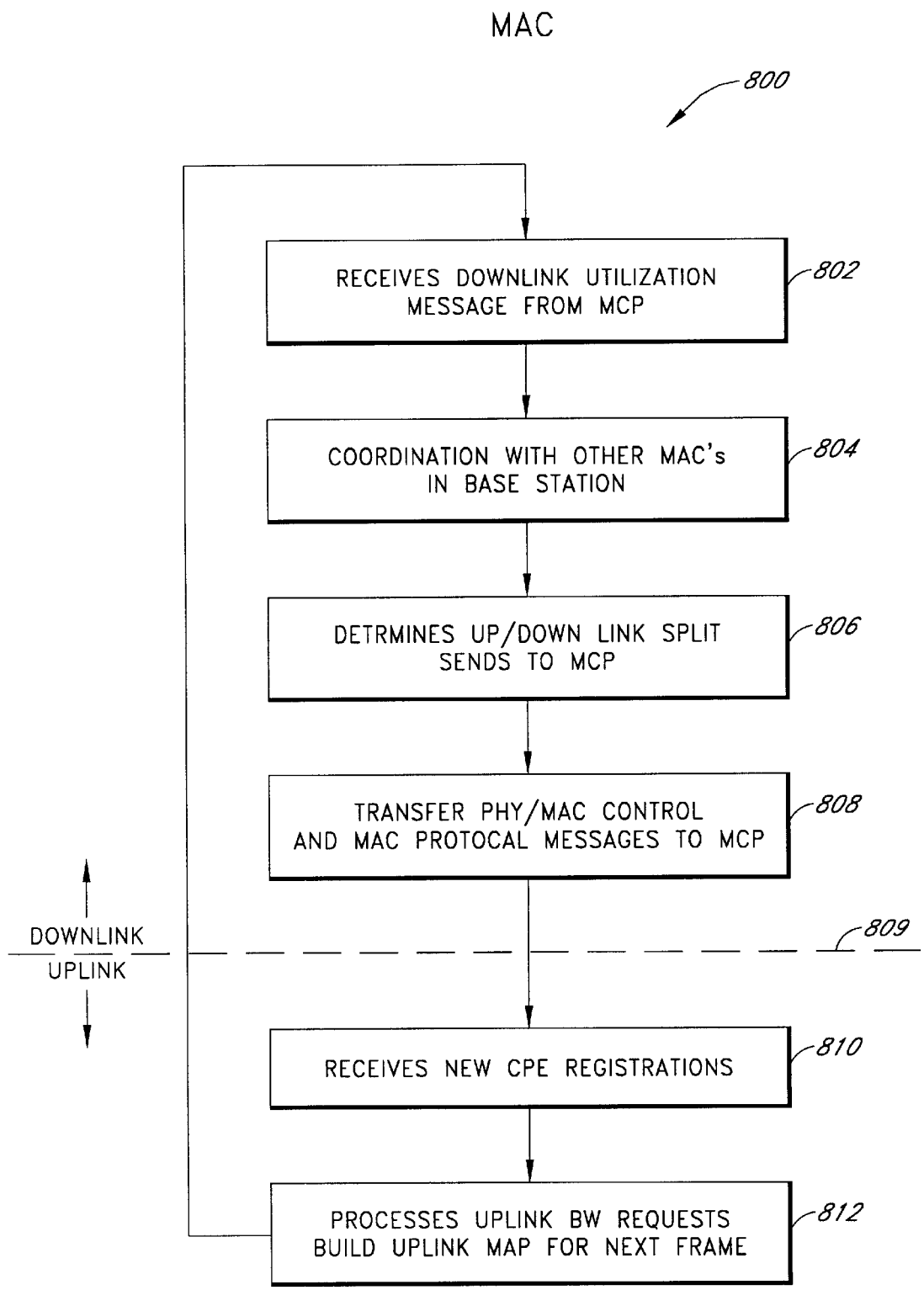
FIG. 8 is a flowchart of the operation of a MAC during a single communication time frame.

FIG. 8 is a flowchart illustrating the operation of the MAC 410 during a single communication time frame.

In step 802, in a TDD system the MAC 410 receives a DUM from the MCP 402 indicating the actual amount of downlink data sent in the previous time frame (discussed above with reference to DUM module 504). In an ATDD system, the DUM will be used by the MAC 410 in step 806 to estimate a up/down split for the subsequent time frame. As stated above, there is less of a need for DUM in a FDD system because the downlink and uplink time frames remain constant (i.e., both use an entire predetermined period time frame). Thus, the actual amount of downlink data sent in a previous time frame may not be important in a FDD system. In one embodiment of an FDD system, the DUM has a secondary purpose of statistics collection, and determination of link congestion.]

In step 804, the MAC 410 co-ordinates with other MAC's 410 in the same BS 104. As discussed above with reference to the MAC coordination module 506, the uplink and downlink times may be adjusted for respective MAC's 410 in the same BS 104 in order to reduce RF interference.

In step 806, in a TDD system the MAC 420 determines an up/down split and transmits the determined split to the MCP 402. As discussed above with reference to the up/down split module 502, in a TDD system the MAC 420 determines how the one millisecond bandwidth should be split between downlink and uplink data. Several factors, such as the up/down split of other MAC's 410 in the same BS 104, uplink bandwidth demands, and CPE 110 settings, such as access, modulation, and quality of service requirements may be considered in determining an appropriate up/down split.

In step 808, the MAC 420 transfers a PHY/MAC control message and MAC protocol messages to the MCP 402. As stated above, the PHY/MAC control message is a broadcast message received by all CPE's 110 at the beginning of the downlink subframe. For example, in a the system of FIG. 2A that sorts according to modulation type, the PHY/MAC control message is located at the beginning of the QAM-4 modulation group. MAC protocol messages are CPE 110 specific messages that are modulated according to the specific CPE 110 settings, and are received by the CPE's 110 at the beginning of the respective modulation group.

Divider 809 indicates a division between the downlink and uplink processes of the MAC 420. In other words, steps 802 and 808 involve the MAC 420 downlinking data while steps 810 and 812 involve the MAC 420 uplinking data.

In step 810, the MAC 420 receives new CPE registrations. As discussed above, the MAC 420 maintains the CPE settings both within the MAC 420 and the LUT 406. When new CPE's 110 are registered, CPE settings in both locations are updated to include the new CPE 110. In addition, the MAC 420 may receive changes to the CPE settings for a particular CPE 110 that require updating the CPE settings in both locations.

In step 812, the MAC 420 allocates uplink bandwidth according to uplink bandwidth requests from CPE's 110. This process is controlled by the uplink bandwidth module 507, discussed above. In general, bandwidth requests are received from CPE's 110, the available bandwidth within the uplink sub-frame is allocated to CPE's 110, and the allocation is sent from the BS 104 to the CPE's 110 in an uplink map so each CPE 110 may uplink data during their particular assigned time. The uplink map received by each CPE 110 is used in the subsequent time frame. Thus, the uplink map received by CPE's 110 in time frame T will indicate when particular CPE's 110 will send uplink data during the uplink portion of time frame T+1.

In an alternative embodiment, the MCP 402 allocates uplink bandwidth and generates the uplink map. In this embodiment, because the MCP 402 is a hardware device, the uplink bandwidth requests, and thus, the uplink map may be created more quickly than in an embodiment that creates the uplink map in the MAC 420. As such, in an ATDD system, the up/down split may be adjusted in real time allowing unused portions of the current downlink subframe to be used by the uplink subframe. More specifically, the uplink map received by CPE's 110 in time frame T may indicate when particular CPE's 110 will send uplink data during the uplink portion of time frame T.

Figure 9:
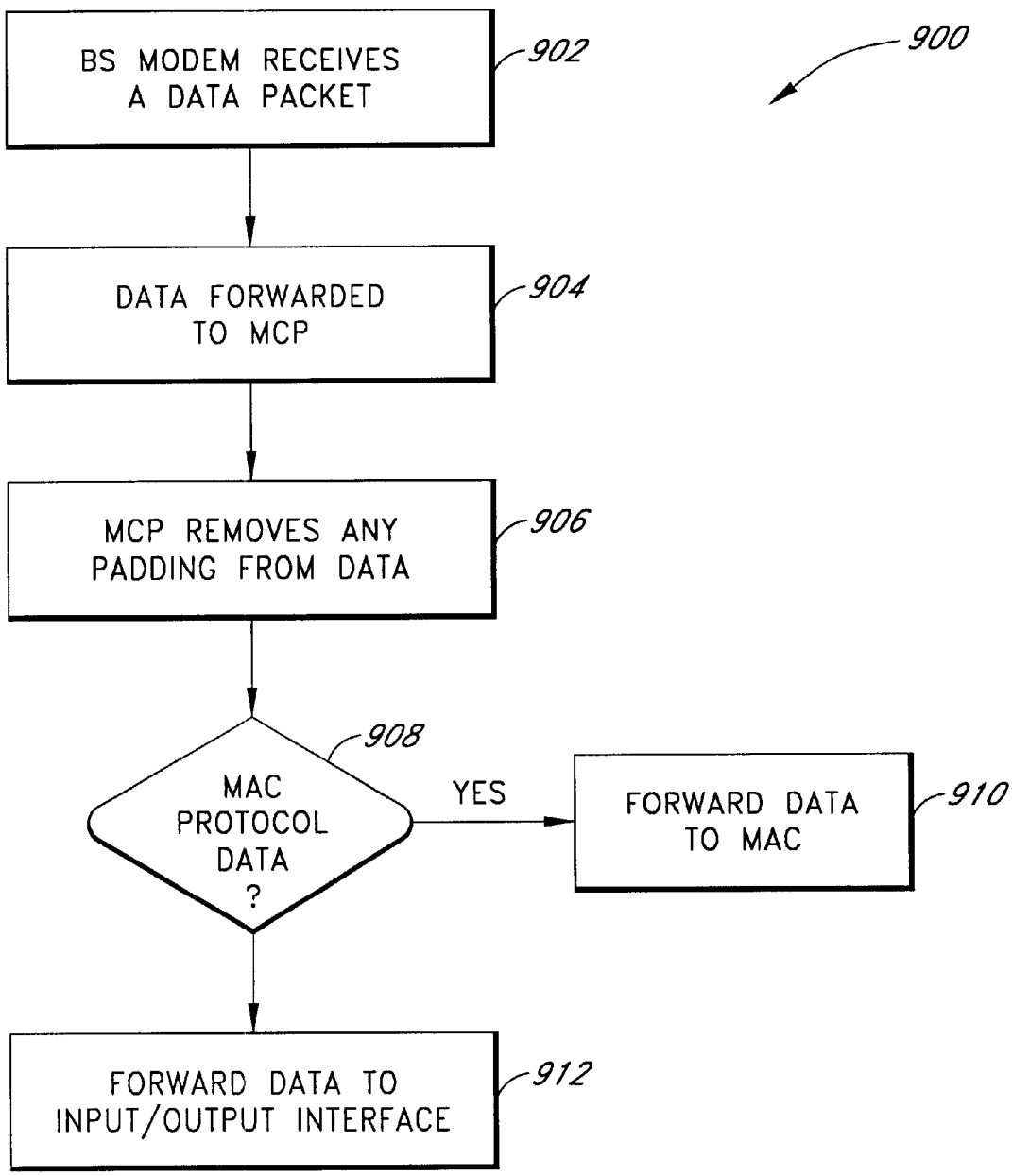
FIG. 9 is a flowchart of the uplink process.

FIG. 9 is a flowchart showing the uplink process of the present invention.

In step 902, the modem 135 receives a data packet from a specific CPE 110. More specifically, during an uplink portion of a time frame data is received by the BS ODU 108 in accordance with the timing requirements of the current uplink map. This data is then transmitted to the modem 135.

In step 904, once a data packet has been received by the modem 135, it is demodulated and forwarded to the MCP 402. The modem 135 relies on the uplink map to determine when data from specific CPE's 110 in certain modulations/FEC will be arriving. The modem 135 may gain access to the uplink map from one of three sources, namely, the modem 135 may intercept the uplink map that the MAC 410 has sent to the plurality of CPE's 110, the modem 135 may receive the uplink map from MCP 402, or the modem 135 may receive the uplink map from the MAC 410.

In step 906, the MCP 402 or the modem 135 removes any padding from the received data. If a particular CPE 110 doesn't have enough data to fill an allocated uplink time frame, the CPE 110 may transmit fill cells or bytes in place of data from connections.

In step 908, the MCP 402 determines if the data is MAC protocol data or user data to be forwarded to the input/output interface 150. This determination is accomplished using the connection ID, as assigned by the BS call control, which is included in the packet header. If the data is MAC protocol data, according to step 910 the data is forwarded to MAC 410 for processing. Alternatively, if the data is user data which eventually needs to reach the backhaul 116, according to step 912 the data is forwarded to the input/output interface 150.

The preceding detailed description of FIGS. 1–9 has been in reference to the functionality of a MCP in a BS 104. In one embodiment, the downlink data is received by a MAC in each of the CPE's 110. Conversely, the MAC in each of the CPE's 110 transmits uplink data to the BS 104. Thus, in this particular embodiment there is no MCP or QoS in the CPE's 110, such that the MAC in the CPE's 110 may perform the functions typically carried out by the QoS and MCP.

CPE MAC Coprocessor

Figure 10:
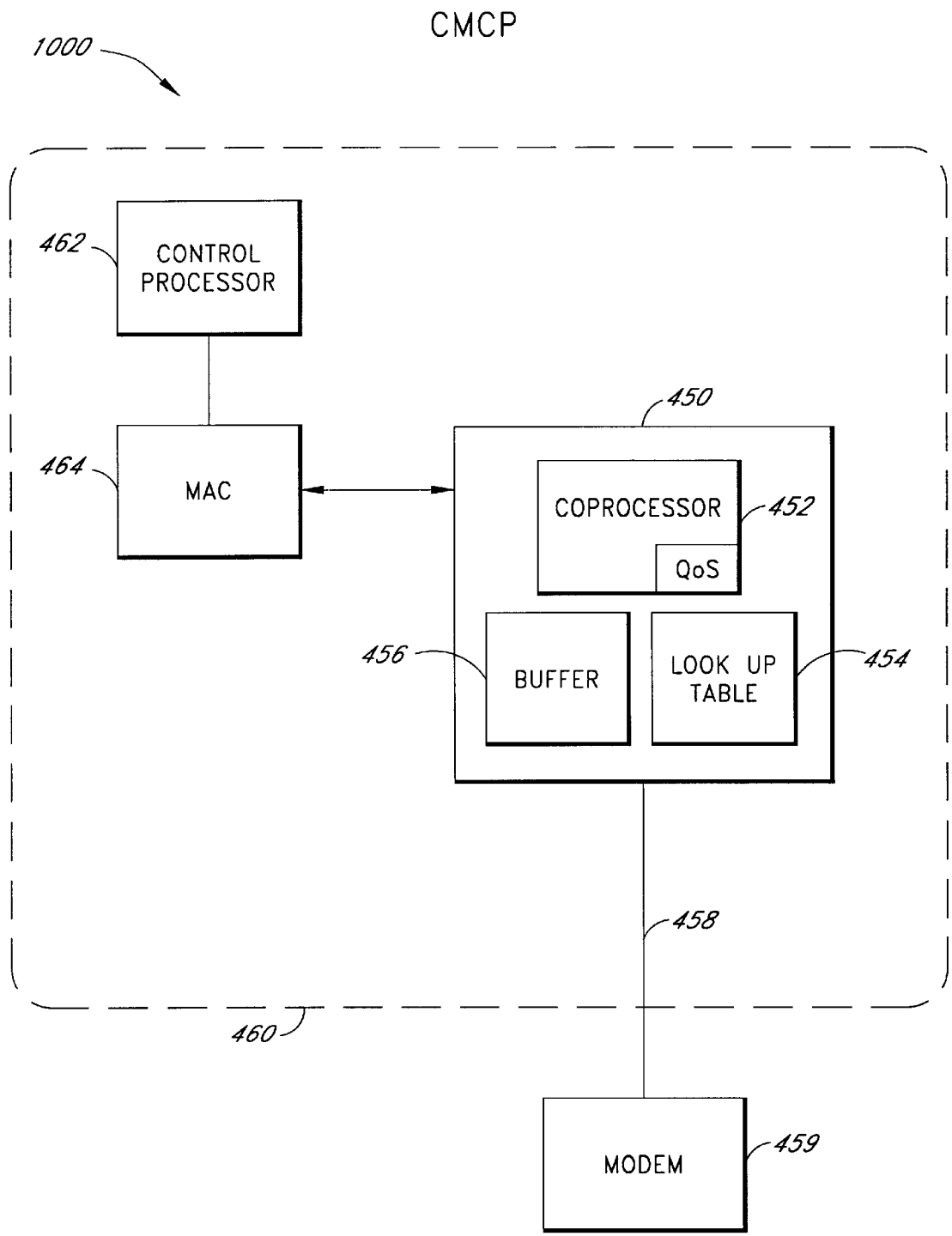
FIG. 10 is a block diagram of one embodiment of a CPE control module including a MAC coprocessor.

FIG. 10 is a block diagram of one embodiment of a CPE control module including a MAC coprocessor. In the embodiment of FIG. 10, each CPE 110 includes a MAC and a CPE MAC Coprocessor ("CMCP"). The CMCP, in addition to performing a prioritizing function similar to the QoS 412, performs many functions similar to the MCP 402 in the BS 104. A detailed description of these functions will now follow.

The CMCP 450 requests uplink bandwidth from the BS 104 by using a contention slot, piggybacking, bandwidth stealing, or a poll-me bit in the uplink data header. As noted above the MAC 410 (in the BS 104) allocates uplink bandwidth among all CPE's 110 requesting uplink bandwidth. The MAC 410 transmits the bandwidth allocations to the CPE's 110 in the form of an uplink map. In one embodiment, CPE's 110 request bandwidth on a per connection basis and are granted bandwidth on a per CPE 110 basis. In other words, even though a CPE 110 may request uplink bandwidth on behalf of a specific end user connection, when the uplink bandwidth is allotted to the CPE 110, the CMCP 450 may determine that a different end user connection will use the uplink bandwidth.

The buffer 456 may continuously receive data for uplink transmission from a plurality of end user connections. The end user connections do not send requests to the CPE 110, but instead send the data they want to uplink. The received data is stored in the buffer 456, indexed according to connection ID, until it is transmitted to the BS MAC 410. The CMCP 450 keeps a real time count of the data stored in the buffer 456 for each respective end user connection. As such, the CMCP 450 always knows the total amount of data ready for uplink, in addition to the total amount ready for uplink from each particular end user connection.

With data waiting in the buffer 456 for uplink, the CMCP 450 intercepts the uplink map (destined for the CPE MAC 410) in order to determine how much uplink bandwidth has been allocated to the particular CPE 110. The CMCP 450 then determines how much data, at the specific CPE's modulation, can fit in the allocated bandwidth. The LUT 454 stores specific end user connection settings, such as an end user connection priority and QoS parameters associated with each end user connection. The CMCP 450 then performs prioritizing functions on the data stored in buffer 456. More specifically, QoS parameters, including a priority, associated with each end user connection with data waiting in buffer 456 are pulled from LUT 454 and is used by the CMCP 450 to prioritize the data using a continuous grant, fair weighted, round robin or other prioritizing scheme. In one embodiment buffer 456 includes a prioritized portion which is used to store the prioritized data that is ready for uplink.

The CMCP 450 determines if there is enough allotted bandwidth, in the current uplink subframe, to send all the data waiting in the buffer 456, or, alternatively, if the CMCP 450 needs to request additional bandwidth from the MAC 410. If additional bandwidth is needed, the CMCP may request additional bandwidth by sending a contention slot request, piggybacking a request, or stealing bandwidth from lower priority data, or setting a poll-me bit in the MAC header of the currently allotted uplink data. If a CPE 110 has been allotted bandwidth in the current uplink sub-frame, the CMCP may set a poll-me bit, in its' uplink MAC header, to tell the MAC 410 that the specific CMCP 450 has more data to uplink. If a CPE 110 has not been allotted bandwidth in the current uplink sub-frame, the CMCP must send a request in a bandwidth request contention slot 324 (FIG. 2B), piggyback a request, or steal bandwidth for a request from lower priority data from a different CPE 110. As an example, if a particular CPE 110 has not been allotted any bandwidth in the current uplink sub-frame and the particular CPE 110 has a lower priority than all other CPE's 110 that have been allotted bandwidth in the current uplink sub-frame, the particular CPE 110 may only be able to send a request during the bandwidth request contention slots 324 (FIG. 2B). Thus, all CPE's 110 will always have at least one means of requesting uplink bandwidth.

The CMCP 450 then builds an uplink data burst, using data pulled from the prioritized portion of the buffer 456, in a similar fashion as described above with respect to the MCP. A data burst may be any combination of user data and control information.

In a second embodiment, the buffer 456 does not move the prioritized data to a different section, but instead sorts a series of pointers that indicate the locations of data stored in the buffer 456. The CMCP 450 may build an uplink data burst using data pulled from the areas indicated by the prioritized pointers.

In one embodiment the CMCP 450 and the MCP 402 may perform three reciprocal operations on transmitted data packets, namely packing/unpacking, payload header suppression/payload header reconstruction and fragmentation/defragmentation. For example, if a CMCP 450 is packing data, the MCP will unpack the data. In another embodiment, the CMCP 450 and the BS MAC 410 perform reciprocal packing/unpacking, payload header suppression/payload header reconstruction and fragmentation/defragmentation. For example, if a CMCP 450 is packing data, the MAC 410 will unpack the data. However, these operations may be implemented using other hardware configurations.

Packing is performed when the sending coprocessor (i.e., the MCP or CMCP) determines that multiple higher level packets will fit in a single data burst. The packing process may save bandwidth by only including the MAC header of the first data packet. For example, if N higher level packets will fit in to a data burst, the header of the first data packet is used to indicated that there are N−1 packets following without MAC headers. The unpacking process reformats each of the N packets to include their own MAC header. Both the MCP 402 and the CMCP 450 may both pack and unpack data.

Payload header suppression may be performed when a higher layer packet has it's own header, i.e. a header that is not created or used by the MCP or CMCP. Payload header suppression removes a portion of the higher level header and the payload header reconstruction reconstructs the higher level header. Again, when the MCP performs payload header suppression, the CMCP 450 performs payload header reconstruction, and vice versa.

Fragmentation may be performed when a higher layer packet cannot fit in to an allotted burst. The higher layer packet may be fragmented to be transmitted over a series of two or more time frames. For example, a specific end user connection may want to uplink a higher layer packet that would fill N time frames. Instead of allotting all available uplink bandwidth to that specific end user connection for N time frames, the CMCP 450 may allot a fraction F (½ for example) of the uplink bandwidth to the specific CPE, such that the specific end user connection now requires N*1/F time frames to uplink their higher layer packet, but other end user connections may use the remaining fraction (1−F) of the bandwidth during that same period. The CMCP 450 does not need to have all data packets (i.e., to fill N time frames) before sending the initial fragmented data packets in an uplink data frame. The MCP will defragment the fragmented portions to form the entire higher layer packet. In a similar manner, the MCP may fragment data which the CMCP 450 will defragment.

Figure 11:
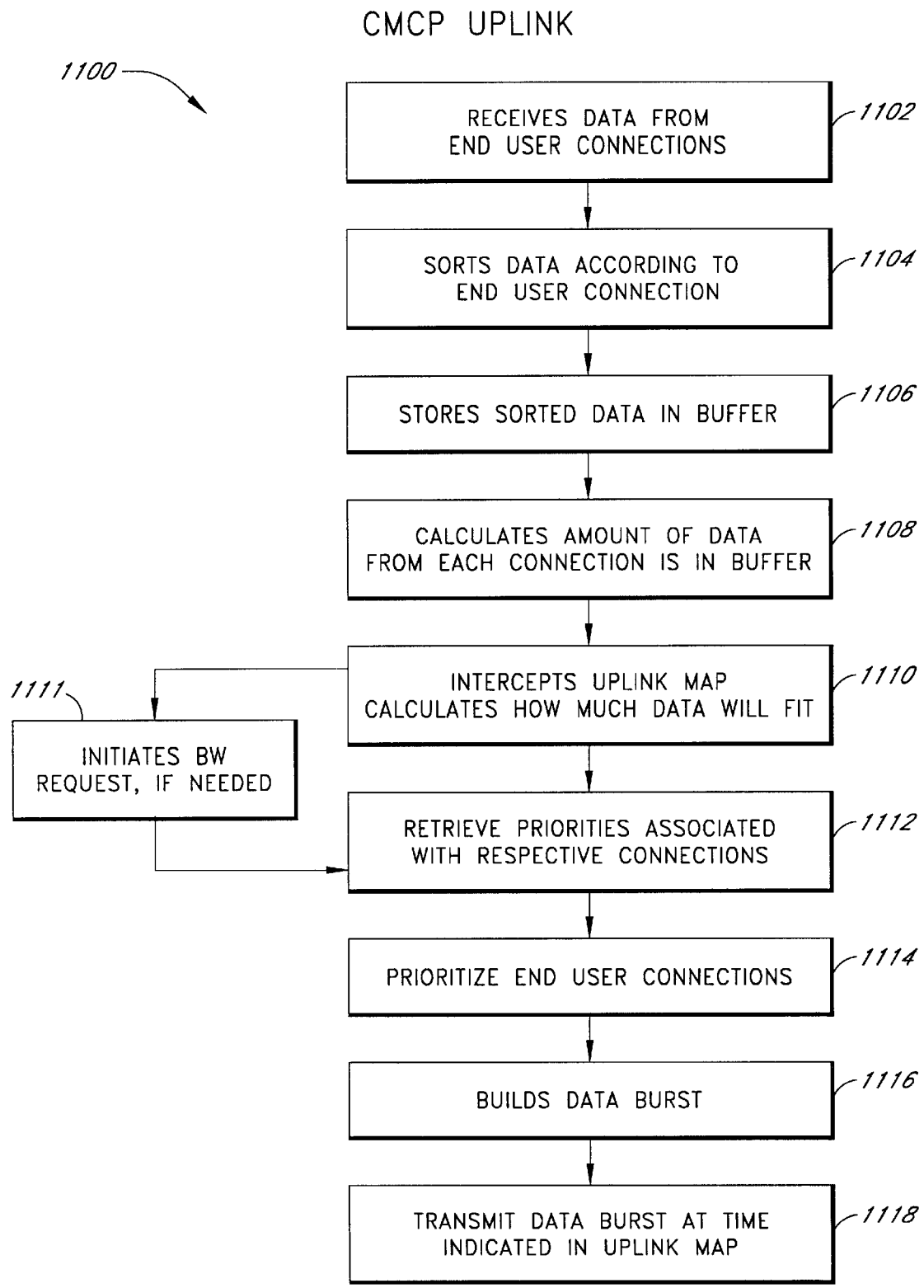
FIG. 11 is a flow chart of the process of uplinking data from a CPE to a BS.

FIG. 11 is a flow chart of the process of uplinking data from a CPE 110 to a BS 104. The process of FIG. 11 is executed in a CPE having a MAC and a CMCP (CPE MAC Coprocessor) 450. As stated above, the CMCP, in addition to performing a prioritizing function similar to the QoS 412 in a BS 104, may perform many functions similar to the MCP 402 in the BS 104.

In step 1102, the CPE receives data from a plurality of end user connections serviced by the specific CPE 110. Each CPE 110 may continuously receive data for uplink transmission. Alternatively, CPE's 110 may sporadically receive data from their respective end user connections. The end user connections do not send requests to the CPE 110, but instead send the data they want to uplink.

In step 1104, the CMCP 450 sorts the received data according to the respective end user connections that sent the data. The sorting process is accomplished by detecting the specific connection from which each data packet was received, and grouping all data packets from a specific connection together.

In step 1106, the CMCP 450 stores the received, sorted data packets in a buffer 456. Because the CPE 110 sporadically receives data packets from end user connection, the CPE 110 doesn's t know how much data will be received during any specific time period. As such, the buffer 456 should be large enough to hold a large volume of data packets for a plurality of predetermined periods. While FIG. 10 shows the buffer 456 within CMCP 450, it is contemplated that a buffer may be disposed apart from the CMCP 450, coupled to the CMCP 450, and accessed in a substantially identical manner as discussed above.

In step 1108, the CMCP 450 calculates the amount off data stored in the buffer 456 from each end user connection. The CMCP 450 knows at any point in time how much data is waiting for uplink from each end user connection, and how much data is waiting for uplink from all end user connections combined.

In step 1110, with data waiting in the buffer 456 for uplink, the CMCP 450 intercepts the uplink map (destined for the CPE MAC 410) in order to determine how much uplink bandwidth has been allocated to the particular CPE 110. The CMCP 450 then determines how much data, at the specific CPE's modulation, can fit in the allocated bandwidth. This calculation will later be used in step 1116 when the CMCP is building the uplink burst.

In step 1111, the CMCP 450 determines if there is enough allotted bandwidth, in the current uplink subframe, to send all the data waiting in the buffer 456, or, alternatively, if the CMCP 450 needs to request additional bandwidth from the MAC 410. If additional bandwidth is needed, the CMCP may request additional bandwidth by sending a contention slot request, piggybacking a request on lower priority data, or setting a poll-me bit in the MAC header of the currently allotted uplink data.

In step 1112, the QoS parameters, including priorities, associated with respective end user connections are pulled from the LUT 454. The QoS parameters are established when the end user initially registers with the MAC 420 and may be updated at any future time or event.

In step 1114, the CMCP 450 performs prioritizing functions on the data stored in buffer 456. Using the priorities pulled from LUT 454, and in consideration of the amount of allotted uplink bandwidth, the CMCP 450 prioritizes the data using a continuous grant, fair weighted, round robin or other prioritizing scheme. In one embodiment buffer 456 includes a prioritized portion which is used to store the prioritized data that is ready for uplink. In a second embodiment, the buffer 456 does not move the prioritized data to a different section, but instead sorts a series of pointers that indicate the locations of data stored in the buffer 456.

In step 1116, the CMCP 450 then builds an uplink data burst that will fill the time allotted to the specific CPE 110 in the uplink subframe. The CMCP 450 may first calculate the number of PS's that will fit in the allotted uplink time at the specific CPE's modulation. The number of PS's required by each data packet included in the data burst (at the specific CPE's modulation) will then be subtracted from this total number of PS's until the data burst is full. In calculating the number of PS's required by each data packet, the CMCP 450 must also consider the FEC type currently used by the CPE 110.

The data burst is built using data pulled from the prioritized portion of the buffer 456, in a similar fashion as described above with respect to the MCP. The CMCP 450 may build an uplink data burst using data pulled from areas of the buffer 456 indicated by prioritized pointers. While building the data burst, the CMCP 450 may use any combination of packing, payload header suppression, and fragmentation. As discussed above, packing, payload header suppression and fragmentation may be performed in step 1116 and used to increase the efficiency of the communication system.

In addition to the end user data sent in the uplink subframe, each CMCP creates and sends a physical layer header and a MAC header to the data burst. The physical layer header may include settings such as modulation and encryption type that are used by the CPE 110 modem and are not sent to the BS 104. The MAC header may include a connection ID, an encryption ON/OFF flag, and an encryption key sequence which are sent to the BS 104.

In step 1118, the CMCP 450 transmits the data burst, at the time specified in the received uplink map, to the CPE modem 459. In addition, any bandwidth request initiated in step 1111 must be transmitted at the appropriate time. For example, if a specific CMCP 450 determines that a bandwidth request should be made during a contention slot, the CMCP tells the modem 459 exactly when to send the bandwidth request. Alternatively, if the CMCP 450 has determined that a piggyback request is possible, the CMCP 450 tells the modem 459 exactly when the piggyback request should be transmitted to the BS 104.

What is claimed is:

1. A system for building a downlink portion of a data frame having a predetermined period, for use in a wireless communication system having a base station coupled to a network backhaul and a plurality of Customer Premises Equipment's ("CPE"), each of said plurality of CPE's being coupled to a plurality of end user connections, and for transmitting data packets from the base station to specified CPE's, the system comprising:
    a first processor including a Media Access Controller ("MAC") configured to establish and maintain connections with said plurality of CPE's ;
    a MAC Co-Processor ("MCP") having
        a Look-Up Table ("LUT") operable to retrieve and store CPE settings for said specific CPE,
        a buffer operable to store data packets according to a sort criteria,
        a decision module operable to determine if said buffer contains data to fill said downlink portion of said data frame or if said predetermined period has occurred,
        said MCP is configured to output said data stored in said buffer when said decision module determines that said buffer contains data to fill said downlink portion of said data frame or when the timeout of said predetermined period has occured; and
    modem coupled to receive said data outputted by said MCP.

2. The system of claim 1, wherein said data frame further comprises an uplink portion;
    said MAC is configured to determine a TDD split, wherein said TDD split is a division of said predetermined period between said uplink portion and said downlink portion.

3. The system of claim 2, wherein said downlink portion is transmitted on a first channel and said uplink portion is received on said first channel within said predetermined period.

4. The system of claim 1, wherein said data frame further comprises an uplink portion;
    said downlink portion is equal to said predetermined period, and said uplink portion is equal to said predetermined period.

5. The system of claim 4, wherein said downlink portion is transmitted on a first channel within said predetermined period and said uplink portion is received on a second channel within said predetermined period.

6. The system of claim 4, wherein said downlink portion is transmitted on a first channel within a first predetermined period and said uplink portion is received on a second channel within a second predetermined period, wherein said first predetermined period and said second predetermined period do not overlap.

7. The system of claim 4, wherein said system further comprises a Quality of Service module ("QoS") connected to said network backhaul and configured to receive a data packet associated with a specific CPE and to assign a priority level to said data packet.

8. The system of claim 1, wherein said predetermined period is five hundred microseconds.

9. The system of claim 1, wherein said predetermined period is one millisecond.

10. The system of claim 1, wherein said predetermined period is two milliseconds.

11. The system of claim 1, wherein said predetermined period is between 250 microseconds and 20 milliseconds.

12. The system of claim 1, wherein said sort criteria is a modulation type.

13. The system of claim 1, wherein said sort criteria is a forward error correction type.

14. The system of claim 1, wherein said sort criteria is a CPE index, wherein said CPE index indicates the specific CPE to which said data packet is destined.

15. The system of claim 1, wherein each of said plurality of end user connections has a specific connection ID and said sort criteria is said specific connection ID.

16. The system of claim 1, wherein said decision module determines if said buffer contains data to fill said downlink portion of said data frame by iteratively subtracting an amount of downlink bandwidth required by each of said received data packets, at each of said CPE's specific modulation type, from a total amount of downlink bandwidth available.

17. The system of claim 1, wherein said decision module determines if said buffer contains data to fill said downlink portion of said data frame by iteratively subtracting an amount of downlink bandwidth required by each of said received data packets, at each of said CPE's specific FEC type, from a total amount of downlink bandwidth available.

18. The system of claim 1, wherein said decision module determines if said buffer contains data to fill said downlink portion of said data frame by iteratively subtracting an amount of downlink bandwidth required by each of said received data packets, at each of said CPE's specific modulation and FEC type, from a total amount of downlink bandwidth available.

19. The system of claim 2, wherein during said uplink portion of said data frame, said MCP receives a plurality of uplink data packets and routes each of said plurality of uplink data packets to either the MAC or to the network backhaul.

20. The system of claim 4, wherein during said uplink portion of said data frame, said MCP receives a plurality of uplink data packets and routes each of said plurality of uplink data packets to either the MAC or to the network backhaul.

21. The system of claim 1, wherein said MCP may perform any combination of packing, payload header compression, and fragmentation on said downlink portion of said data frame.

22. The system of claim 1, wherein said MCP adds control settings to said data stored in said buffer, wherein said control settings may include a modulation type, a FEC type, an encryption ON/OFF flag, an encryption key, a key number, and modem control information specific to each of said plurality of CPE's.

23. The system of claim 1, wherein said first processor further comprises:
   an uplink bandwidth module configured to allocate available uplink bandwidth according to uplink bandwidth requests from said plurality of CPE's.

24. A system for building a TDD data frame with a plurality of data packets, said data frame having a predetermined period and comprising a downlink portion and an uplink portion, for use in a communication system having a base station and a plurality of Customer Premises Equipment's ("CPE"), each of said plurality of CPE's being coupled to a plurality of end user connections, the system comprising:
   a first processor configured to divide said predetermined period into said downlink portion and said uplink portion;
   a coprocessor including
      a buffer storage module configured to receive and sort said plurality of data packets in a buffer,
      a buffer update module configured to add control settings to said plurality of data packets in said buffer,
      an interface module configured to transmit said plurality of data packets in said buffer to an output, wherein said transmission occurs at the end of said predetermined period.

25. The system of claim 24, wherein said buffer storage module sorts said plurality of data packets in said buffer according to a burst type associated with each of said plurality of data packets, wherein a burst type is any combination of a modulation type and a FEC type.

26. The system of claim 24, wherein said coprocessor further comprises a routing module configured to route an uplink data packet to either the MAC or the network backhaul.

27. The system of claim 24, wherein said control settings may comprise a modulation type, a FEC type, an encryption ON/OFF flag, an encryption key, a key number, and modem control information specific to each of said plurality of CPE's.

28. The system of claim 24, wherein said predetermined period is five hundred microseconds.

29. The system of claim 24, wherein said predetermined period is one millisecond.

30. The system of claim 24, wherein said predetermined period is two milliseconds.

31. The system of claim 24, wherein said predetermined period is between 250 microseconds and 20 milliseconds.

32. The system of claim 24, wherein said interface module creates a download utilization message in response to an amount of bandwidth used in a previous data frame.

33. The system of claim 24, wherein said first processor further comprises:
   a downlink utilization message module configured to receive a downlink utilization message from said interface module, said downlink utilization message is usable by said first processor to determine said uplink portion and said downlink portion of said predetermined period.

34. The system of claim 24, wherein said first processor further comprises:
   an uplink bandwidth module configured to allocate available uplink bandwidth according to uplink bandwidth requests from said plurality of CPE's.

35. The system of claim 24, wherein said system further comprises:
   a Quality of Service module ("QoS") configured to send said plurality of data packets to said coprocessor, wherein said coprocessor requests each of said data packets from said QoS;
   said QoS prioritizes said plurality of data packets according to a predetermined criteria before sending each of said data packets to said coprocessor.

36. The system of claim 24, wherein said system further comprises a decision module configured to determine if said buffer contains data to fill said downlink portion of said data frame by iteratively subtracting an amount of downlink bandwidth required by each of said incoming data packets, at each of said CPE's specific burst type, from a total amount of downlink bandwidth available, wherein a burst type is any combination of a modulation type and a FEC type.

37. The system of claim 24, wherein said first processor further comprises:
   an uplink bandwidth module configured to allocate available uplink bandwidth according to uplink bandwidth requests from said plurality of CPE's.

38. A system for building a downlink portion of a FDD data frame having a predetermined period with a plurality of data packets, for use in a communication system having a base station and a plurality of Customer Premises Equipment's ("CPE"), each of said plurality of CPE's being coupled to a plurality of end user connections, the system comprising:
   a processor including a Media Access Controller ("MAC") configured to route said data packets to specified end user connections;
   a coprocessor including
      a buffer storage module configured to receive and sort said plurality of data packets in a buffer,
      a buffer update module configured to add control settings to said plurality of data packets in said buffer,
      an interface module configured to transmit said plurality of data packets in said buffer to a modem, wherein said transmission occurs during said predetermined period.

39. The system of claim 38, wherein said buffer storage module sorts said plurality of data packets in said buffer according to a burst type associated with each of said plurality of data packets, wherein a burst type is any combination of a modulation type and a FEC type.

40. The system of claim 38, wherein said predetermined period is five hundred microseconds.

41. The system of claim 38, wherein said predetermined period is one millisecond.

42. The system of claim 38, wherein said predetermined period is two milliseconds.

43. The system of claim 38, wherein said predetermined period is between 250 microseconds and 20 milliseconds.

44. The system of claim 38, wherein said FDD frame further comprised an uplink portion and said interface module is configured to receive said uplink portion of said data frame from said modem, wherein said reception occurs during said predetermined period.

45. The system of claim 38, wherein said FDD frame further comprised an uplink portion and said interface module is configured to receive said uplink portion of said data frame from said modem, wherein said reception occurs during a second predetermined period, such that said predetermined period and said second predetermined period do not overlap.

46. The system of claim 38, wherein said control settings may comprise a modulation type, a FEC type, an encryption ON/OFF flag, an encryption key, a key number, and modem control information specific to each CPE intended to receive a portion of said plurality of data packets in said downlink portion of said data frame.

47. The system of claim 38, wherein said system further comprises:
 a Quality of Service module ("QoS") configured to send said plurality of data packets to said coprocessor, wherein said coprocessor requests each of said data packets from said QoS;
 said QoS prioritizes said plurality of data packets according to a predetermined criteria before sending each of said data packets to said coprocessor.

48. The system of claim 38, wherein said system further comprises a decision module configured to determine if said buffer contains data to fill said downlink portion of said data frame by iteratively subtracting an amount of downlink bandwidth required by each of said incoming data packets, at each of said CPE's specific burst type, from a total amount of downlink bandwidth available, wherein a burst type is any combination of a modulation type and a FEC type.

49. A method of building a data frame with a plurality of data packets, said data frame comprising a downlink portion and an uplink portion and having a predetermined period, for use in a communication system having a base station and a plurality of Customer Premises Equipment's ("CPE"), each of said plurality of CPE's being coupled to a plurality of end user connections, said base station including a MAC processor and a MAC coprocessor, said MAC coprocessor performing the steps of:
 (a) arranging incoming data packets according to a predetermined priority order,
 (b) receiving at said MAC coprocessor one of said plurality of data packets corresponding to one of said plurality of CPE's, according to said predetermined priority order,
 (c) sorting said plurality of data packets according to a burst type and storing said one of said plurality of data packets in a buffer,
 (d) determining if the timeout of said predetermined period has occured, wherein in response to said determination that the timeout of said predetermined period has occurred, skipping step (e) and going directly to step (f),
 (e) determining if said buffer contains enough of said plurality of data packets to fill said downlink portion of said data frame, wherein in response to said determination that said buffer does not contain enough of said plurality of data packets to fill said downlink portion of said data frame, repeating the process from step (a), otherwise continuing to step (f),
 (f) transferring contents of said buffer to a modem.

50. The method of claim 49, wherein said burst type is any combination of a modulation type and a FEC type.

51. The method of claim 49, wherein said predetermined period is five hundred microseconds.

52. The method of claim 49, wherein said predetermined period is one millisecond.

53. The method of claim 49, wherein said predetermined period is two milliseconds.

54. The method of claim 49, wherein said predetermined period is between 250 microseconds and 20 milliseconds.

55. The method of claim 49, wherein said decision module determines if said buffer contains data to fill said downlink portion of said data frame by iteratively subtracting an amount of downlink bandwidth required by each of said incoming data packets, at each of said CPE's specific burst type, from a total amount of downlink bandwidth available.

56. A system for transmitting at least a portion of an uplink data frame in a wireless communication system, said data frame having a plurality of data packets and having a predetermined period, said communication system having a base station and a plurality of Customer Premises Equipment's ("CPE"), each of said plurality of CPE's being coupled to a plurality of end user connections, the system comprising:
 a processor disposed in said base station including a Media Access Controller ("MAC") configured to allot a specific portion of an uplink portion of said data frame to a specific CPE and to transmit an uplink map indicating said allotment to said specific CPE;
 an uplink data buffer configured to store uplink data received from said plurality of end user connections coupled to said specific CPE,
 a coprocessor disposed in said specific CPE configured to allocate said allotted portion of said data frame amongst a plurality of end user connections coupled to said specific CPE, said coprocessor comprising
  a look-up table configured to store priority parameters corresponding to each of said plurality of end user connections coupled to said specific CPE,
  a prioritizing module configured to prioritize said uplink data in said uplink data buffer according to said priority parameters corresponding to each of said plurality of end user connections connected to said specific CPE,
  a decision module configured to receive said uplink map from said processor and determine, according to said received uplink map, when a data burst should be sent to said base station, wherein said data burst contains data pulled from said uplink data buffer in an order determined by said prioritizing module.

57. The system of claim 56, wherein said coprocessor transmits a bandwidth request to said processor.

58. The system of claim 57, wherein said bandwidth request is transmitted to said processor in the event said allotted portion of said uplink map is not long enough to transmit all of said uplink data currently stored in said uplink data buffer.

59. The system of claim 57, wherein said bandwidth request is transmitted during a bandwidth request contention slot portion of said uplink portion of said data frame.

60. The system of claim 57, wherein said bandwidth request is transmitted during a portion of said uplink portion of said data frame allotted to a second specific CPE.

61. The system of claim 56, wherein said data burst comprises a poll-me bit;
 said poll-me bit is set such that said MAC will poll said specific CPE with a bandwidth inquiry.

62. The system of claim 56, wherein said coprocessor may perform any combination of packing, payload header compression, and fragmentation on said data burst.

63. The system of claim 56, wherein said decision module determines how much data will fit in said data burst such that said data burst may be transmitted during said allotted portion of said uplink data frame;

said determination is made with respect to a modulation type of said specific CPE.

64. A method of transmitting at least a portion of an uplink data frame in a wireless communication system, said data frame having a plurality of data packets and having a predetermined period, said communication system having a base station and a plurality of Customer Premises Equipment's ("CPE"), each of said plurality of CPE's being coupled to a plurality of end user connections, the method comprising:

transmitting from said base station to a specific CPE an uplink map indicating an allotted portion of said uplink data frame allotted to said specific CPE;

said CPE performing the steps of
storing a plurality of uplink data received from said plurality of end user connections coupled to said specific CPE in an uplink data buffer,
receiving said uplink map from said base station,
prioritizing said uplink data in said uplink data buffer according to a priority parameter corresponding to each of said plurality of end user connections,
allocating said allotted portion of said data frame amongst a plurality of end user connections coupled to said specific CPE,
determining a transmit time, according to said received uplink map, when a data burst should be sent to said base station, wherein said data burst contains data pulled from said uplink data buffer in an order determined by said prioritizing,
transmitting said data burst at said transmit time.

65. The method of claim 64 further comprising transmitting a bandwidth request to said base station.

66. The method of claim 65, wherein said bandwidth request is transmitted in the event said allotted portion of said uplink map is not long enough to transmit all of said uplink data currently stored in said uplink data buffer.

67. The method of claim 65, wherein said bandwidth request is transmitted during a bandwidth request contention slot portion of said uplink portion of said data frame.

68. The method of claim 65, wherein said bandwidth request is transmitted during a portion of said uplink portion of said data frame allotted to a second specific CPE.

69. The method of claim 64, wherein said data burst comprises a poll-me bit;

said poll-me bit is set, such that said MAC will poll said specific CPE with a bandwidth inquiry.

70. The method of claim 64, wherein said coprocessor may perform any combination of packing, payload header compression, and fragmentation on said data burst.

71. The method of claim 64, further comprising the step of
determining how much data will fit in said data burst such that said data burst may be transmitted during said allotted portion of said uplink data frame;
said determination is made with respect to a modulation type of said specific CPE.

* * * * *